(12) United States Patent
Spray et al.

(10) Patent No.: US 11,560,930 B2
(45) Date of Patent: Jan. 24, 2023

(54) BRAKE DISC INSERT WITH RETAINER

(71) Applicant: Honeywell International Inc., Charlotte, NC (US)

(72) Inventors: Matthew Spray, Elkhart, IN (US); Jonathan T. Beehler, Bremen, IN (US)

(73) Assignee: Honeywell International Inc., Charlotte, NC (US)

( * ) Notice: Subject to any disclaimer, the term of this patent is extended or adjusted under 35 U.S.C. 154(b) by 38 days.

(21) Appl. No.: 17/079,222

(22) Filed: Oct. 23, 2020

(65) Prior Publication Data
US 2022/0128108 A1   Apr. 28, 2022

(51) Int. Cl.
| F16D 65/097 | (2006.01) |
| F16D 65/12 | (2006.01) |
| B64C 25/44 | (2006.01) |
| F16D 65/02 | (2006.01) |

(52) U.S. Cl.
CPC ............ *F16D 65/123* (2013.01); *B64C 25/44* (2013.01); *F16D 2065/138* (2013.01); *F16D 2065/1364* (2013.01); *F16D 2065/1376* (2013.01); *F16D 2065/1392* (2013.01); *F16D 2250/0084* (2013.01)

(58) Field of Classification Search
CPC ..................... F16D 65/123–128; F16D 65/097
USPC .................................. 188/71.5, 71.6, 218 XL
See application file for complete search history.

(56) References Cited

U.S. PATENT DOCUMENTS

| 3,345,109 A | 10/1967 | Petersen et al. |
| 3,605,967 A | 9/1971 | Warren et al. |
| 3,972,395 A * | 8/1976 | Jannasch ............... F16D 69/023 188/218 XL |
| 4,083,434 A | 4/1978 | Pinter |
| 4,155,432 A | 5/1979 | Krause |
| 4,465,165 A * | 8/1984 | Bok ....................... F16D 65/126 188/218 XL |
| 4,511,021 A | 4/1985 | Grider |
| 4,557,356 A * | 12/1985 | Petersen ............... F16D 65/126 188/218 XL |
| 4,742,948 A | 5/1988 | Fisher et al. |

(Continued)

FOREIGN PATENT DOCUMENTS

| DE | 10159799 A1 | 6/2003 |
| EP | 1988305 A1 | 11/2008 |

(Continued)

OTHER PUBLICATIONS

Advisory Action from U.S. Appl. No. 16/748,836, dated Jan. 28, 2022, 3 pp.

(Continued)

*Primary Examiner* — Christopher P Schwartz
(74) *Attorney, Agent, or Firm* — Shumaker & Sieffert, P.A.

(57) ABSTRACT

In some examples, a drive insert comprises a first clip, a second clip, and a retainer. The first clip is configured to be slidable over a first surface adjacent to a first drive slot of a brake disc in a first tangential direction of the brake disc. The second clip is configured to be slidable over a second surface adjacent to a second drive slot of the brake disc in a second tangential direction of the brake disc. The retainer is configured to be slidable over the first clip and the second clip when the first clip and second clip are positioned one the brake disc secure the first and second clips to the brake disc.

20 Claims, 9 Drawing Sheets

(56) References Cited

U.S. PATENT DOCUMENTS

| | | | |
|---|---|---|---|
| 4,784,246 A | 11/1988 | Edmisten | |
| 4,863,001 A * | 9/1989 | Edmisten | F16D 65/126 188/218 XL |
| 4,865,160 A | 9/1989 | Casey | |
| 5,273,140 A | 12/1993 | Berwanger | |
| 5,560,452 A | 10/1996 | Labougle | |
| 6,635,355 B2 | 10/2003 | Bianco et al. | |
| 6,843,350 B2 | 1/2005 | Larkin et al. | |
| 7,410,036 B2 | 8/2008 | Wimmer et al. | |
| 7,766,133 B2 | 8/2010 | Cress | |
| 7,802,758 B2 | 9/2010 | Cress et al. | |
| 8,365,882 B2 | 2/2013 | Kirschner et al. | |
| 9,897,153 B2 | 2/2018 | Tremblay | |
| 9,976,612 B2 | 5/2018 | Tremblay | |
| 10,221,905 B2 | 3/2019 | Stevenson | |
| 10,436,265 B2 | 10/2019 | Stevenson | |
| 2007/0181388 A1 | 8/2007 | Schlitz et al. | |
| 2007/0193836 A1 | 8/2007 | Walker et al. | |
| 2008/0041674 A1 | 2/2008 | Walker et al. | |
| 2013/0008749 A1 | 1/2013 | Sandberg et al. | |
| 2018/0128331 A1* | 5/2018 | Stevenson | F16D 55/36 |
| 2019/0048949 A1 | 2/2019 | Stevenson | |
| 2021/0222745 A1* | 7/2021 | Spray | B60T 1/065 |

FOREIGN PATENT DOCUMENTS

| | | |
|---|---|---|
| EP | 1798438 B1 | 11/2012 |
| EP | 3168492 A2 | 5/2017 |
| EP | 3441638 A1 | 2/2019 |
| EP | 3855038 A1 | 7/2021 |
| FR | 2266054 A1 | 10/1975 |
| FR | 2719879 A1 | 11/1995 |
| GB | 1475237 A | 6/1977 |
| GB | 2139300 A | 11/1984 |
| RU | 2093726 C1 | 10/1997 |
| WO | 2019115287 A1 | 6/2019 |

OTHER PUBLICATIONS

Final Office Action from U.S. Appl. No. 16/748,836, dated Nov. 10, 2021, 12 pp.

Office Action from U.S. Appl. No. 16/748,836, dated Jun. 7, 2021, 11 pp.

Response to Final Office Action dated Nov. 10, 2021 and the Advisory Action dated Jan. 28, 2022, from U.S. Appl. No. 16/748,836, filed Feb. 8, 2022, 11 pp.

Response to Office Action dated Nov. 10, 2021, from U.S. Appl. No. 16/748,836, filed Jan. 6, 2022, 9 pp.

Response to Office Action dated Jun. 7, 2021, from U.S. Appl. No. 16/748,836, filed Aug. 31, 2021, 9 pp.

"Aircraft Wheels—Wheel Construction," Flight Mechanic, accessed from http://www.flight-mechanic.com/aircraft-wheels-wheel-construction/, accessed on Aug. 2, 2019, 6 pp.

U.S. Appl. No. 16/856,141, by Honeywell International Inc. (Inventors: Lindner et al.), filed Apr. 23, 2020.

U.S. Appl. No. 16/748,836, by Honeywell International Inc. (Inventors: Spray et al.), filed Jan. 22, 2020.

Office Action from U.S. Appl. No. 16/748,836, dated Jun. 24, 2022, 8 pp.

Extended Search Report from counterpart European Application No. 21201549.9 dated Mar. 23, 2022, 7 pp.

Response to Extended Search Report dated Mar. 23, 2022, from counterpart European Application No. 21201549.9 filed May 16, 2022, 51 pp.

Response to Office Action dated Jun. 24, 2022 from U.S. Appl. No. 16/748,836, filed Sep. 14, 2022, 11 pp.

Final Office Action from U.S. Appl. No. 16/748,836 dated Nov. 4, 2022, 9 pp.

* cited by examiner

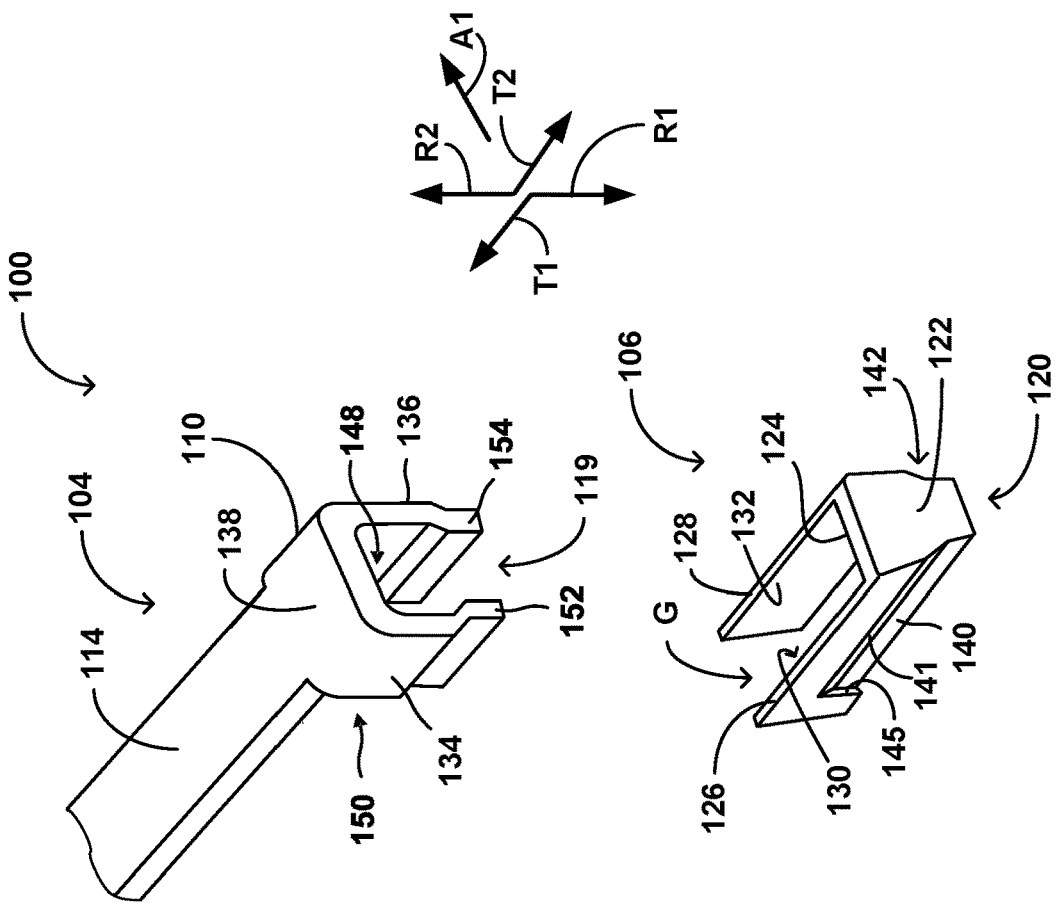
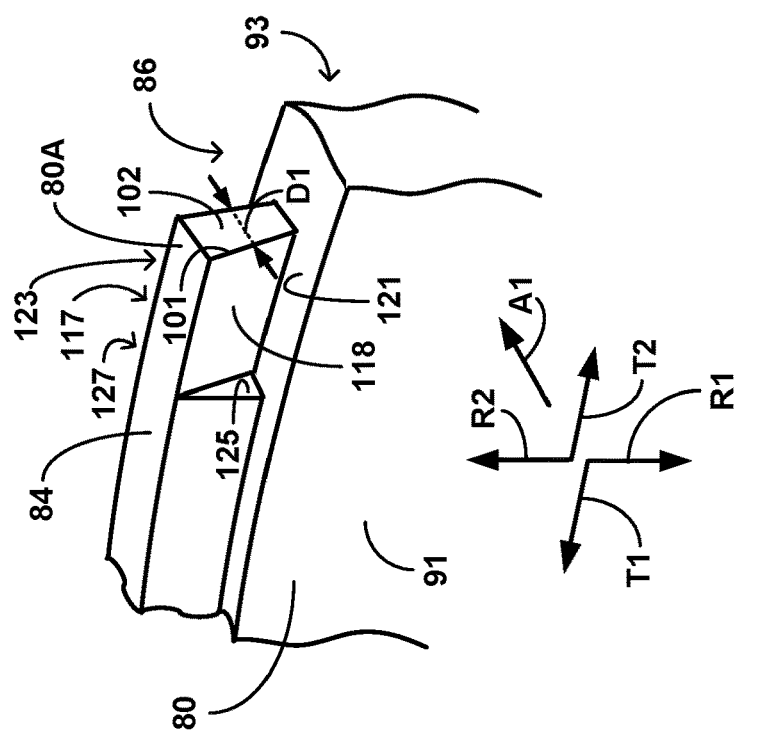
FIG. 7
FIG. 6

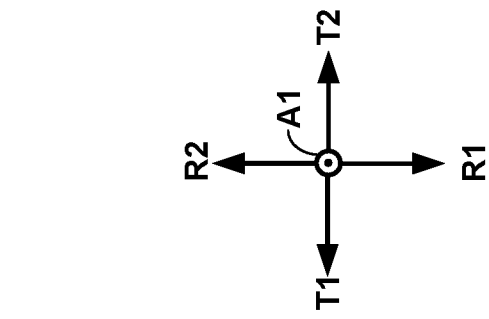
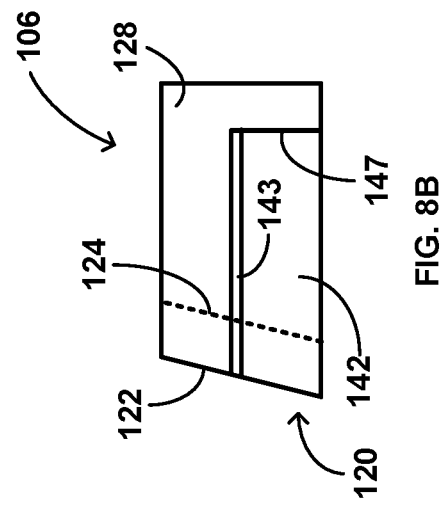
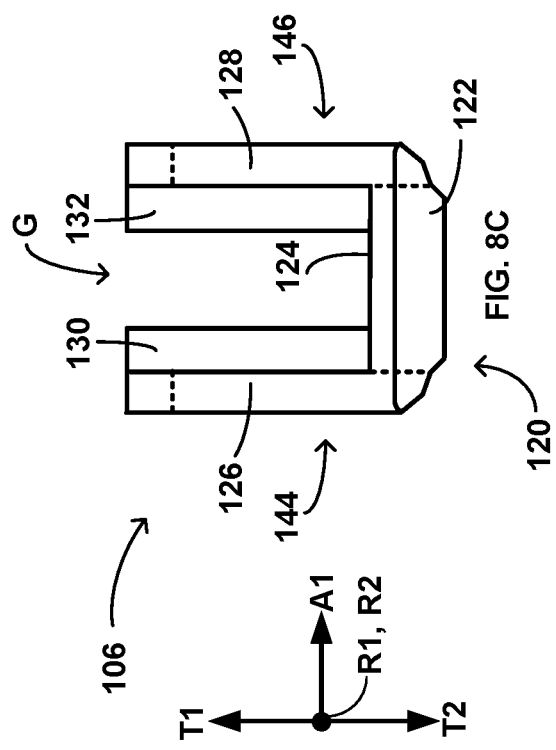
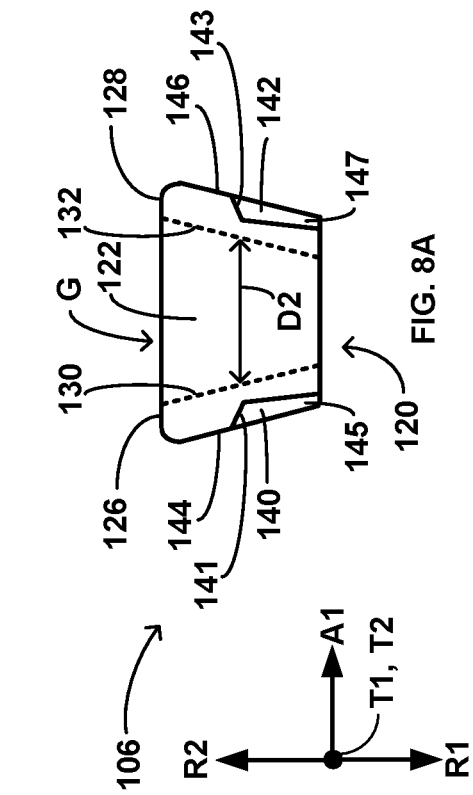

BRAKE DISC INSERT WITH RETAINER

TECHNICAL FIELD

The present disclosure relates to wheel brake systems of a vehicle.

BACKGROUND

Vehicles, such as aircrafts, may use a wheel brake system that includes a disc stack assembly. For example, the brake system may include a plurality of rotors engaged with a wheel and a plurality of stators interleaved with the rotors. The rotors and wheel are configured to rotate around an axle, while the stators remain rotationally stationary. To decelerate rotational motion of a rotating wheel, the brake system may displace pistons against a pressure plate to squeeze the rotating rotors engaged with the wheel against the stationary stators, therefore producing torque that decelerates the rotational motion of the wheel. In some examples, the rotors may engage with the wheel via rotor drive keys positioned on an interior surface of the wheel. In some such examples, the rotors may define slots configured to receive the rotor drive keys.

SUMMARY

In general, the disclosure describes articles, systems, and techniques relating to a drive insert for a brake disc in a wheel brake system of a vehicle. The brake disc has two or more drive slots around the brake disc periphery, the drive slots being configured to receive a rotor drive key of the wheel brake system. The drive insert is configured to mechanically couple with the brake disc at a drive slot, e.g., such that some portion of the drive insert resides within the drive slot of the brake disc. The drive insert may be configured to help protect the brake disc against, for example, the mechanical stresses borne by the drive slot of the brake disc during braking operations of the wheel brake system.

In examples described herein, the drive insert includes a first clip, a second clip, and a retainer configured to secure the first and second clips to the brake disc. The first clip is configured to engage a first drive slot of a brake disc and the second clip is configured to engage a second drive slot of the brake disc different from the first drive slot. The first clip, the second clip, and the retainer are configured to secure the drive insert to the brake disc without requiring a fastener (e.g., a rivet) or other element that penetrates through the drive insert and into the brake disc.

In examples described herein, the first clip is configured to be slidable over a first surface of the brake disc, e.g., in a substantially tangential direction of the brake disc, where the first surface is adjacent to the first drive slot of the brake disc. The second clip is configured to be slidable over a second surface of the brake disc adjacent to the second drive slot of the brake disc, e.g., in a substantially tangential direction. The retainer is configured to be positioned (e.g., slidable in a radial direction of the brake disc) over the first clip and the second clip when the first clip and second clip are positioned over the respective surfaces of the brake disc. In some examples, the retainer is configured to provide a snap-fit with the clip.

In an example, an assembly comprises: a first clip configured to be slidable over a first surface of a brake disc in a first tangential direction of the brake disc, the first surface being adjacent to a first drive slot on a perimeter of the brake disc; a second clip configured to be slidable over a second surface of the brake disc in a second tangential direction opposite the first tangential direction, the second surface being adjacent to a second drive slot on the perimeter of the brake disc; and a retainer configured to be slidable over the first clip and the second clip when the first clip is positioned over the first surface and the second clip is positioned over the second surface to secure the first and second clips to the brake disc.

In an example, an assembly comprises: a brake disc defining: a first drive slot extending at least partially through a perimeter of the brake disc in an axial direction of the brake disc, wherein a first torque face defines a portion of the first drive slot; a first surface adjacent to the first drive slot; a second drive slot extending at least partially through the perimeter of the brake disc in an axial direction of the brake disc, wherein a second torque face defines a portion of the second drive slot; and a second surface adjacent the second drive slot; a first clip configured to position on the brake disc by sliding over the first surface in a first tangential direction of the brake disc, wherein the first clip is configured to cover at least a portion of the first torque face when the first clip is positioned on the brake disc; a second clip configured to position on the brake disc by sliding over the second surface in a second tangential direction of the brake disc opposite the first tangential direction, wherein the second clip is configured to cover at least a portion of the second torque face when the second clip is positioned on the brake disc; and a retainer configured to be slidable over the first clip and the second clip when the first clip and the second clip are positioned on the brake disc, wherein the retainer is configured to maintain the first clip and the second clip on the brake disc when at one of the first clip or the second clip experiences a force in a tangential direction of the brake disc.

In an example, a method comprises: positioning a first clip on a brake disc, wherein positioning the first clip on the brake disc comprises sliding the first clip in a first tangential direction of the brake disc over a first surface, wherein the first surface is adjacent to a first drive slot on a perimeter of the brake disc; positioning a second clip on the brake disc, wherein positioning the second clip on the brake disc comprises sliding the second clip in a second tangential direction of the brake disc over a second surface, wherein the second tangential direction is opposite the first tangential direction, and wherein the second surface is adjacent to a second drive slot on the perimeter of the brake disc; and after positioning the first and second clips on the brake disc, positioning a retainer over the first clip and the second clip, wherein positioning the retainer over the first clip and the second clip comprises sliding the retainer over the first clip and sliding the retainer over the second clip.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is an isometric view of a section of an example brake disc.

FIG. 7 is an isometric view of an example first clip and a portion of an example retainer of a drive insert.

FIG. 8A is a front view of the first clip of FIG. 7.

FIG. 8B is a side view of the first clip of FIG. 7.

FIG. 8C is a top view of the first clip of FIG. 7.

DETAILED DESCRIPTION

Figure 1:
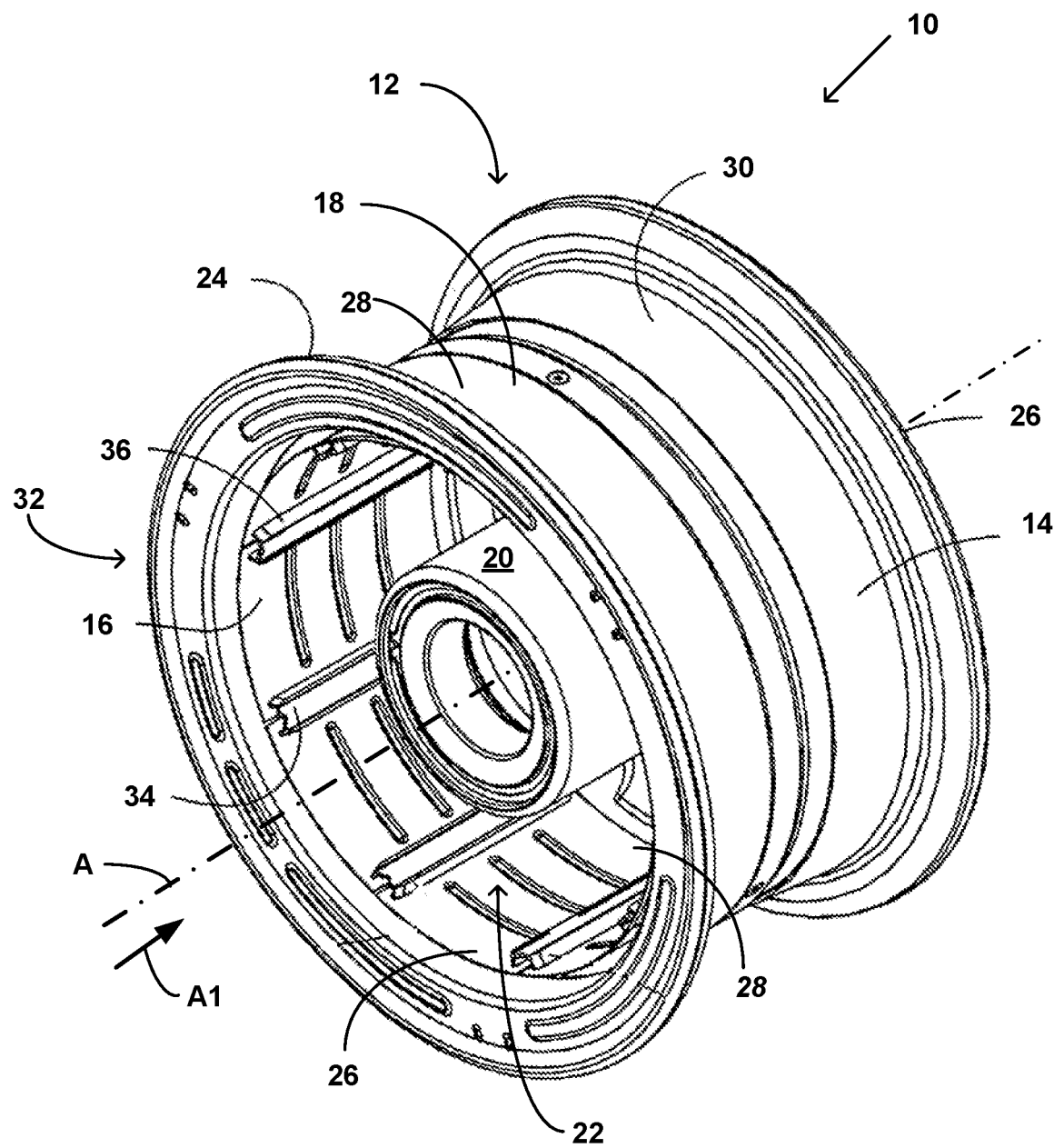
FIG. 1 is a perspective view illustrating an example wheel including a plurality of rotor drive keys on an interior surface of the wheel.

The disclosure describes articles, systems, and techniques relating to a drive insert for a brake disc in a wheel brake system of a vehicle. The drive insert described herein is configured to be mechanically coupled to a brake disc, which may be one of a plurality of brake discs of a brake disc stack of a brake system. The brake disc defines a plurality of drive slots around the brake disc periphery, and the drive insert is configured to mechanically couple with the brake disc at a first drive slot and a second drive slot of the plurality. The drive insert is configured such that at least some portion of the drive insert resides between a drive slot of a brake disc and a rotor drive key extending through the drive slot when the brake disc is assembled within a brake system. For example, the drive insert may be configured such that a portion of the drive insert resides between the first drive slot and a first rotor drive key extending through the first drive slot, and such that a portion of the drive insert resides between the second drive slot and a second rotor drive key extending through the second drive slot. The drive insert may be configured to protect the brake disc against, for example, the mechanical stresses borne by the first and second drive slots of the brake disc during braking operations of a brake system.

The drive insert is configured to mechanically couple to the brake disc in a manner that limits movement of the drive insert relative to the brake disc and without requiring a fastener (e.g., a rivet) or other element that penetrates through the drive insert and into the brake disc. Rivets and other fasteners which attach drive inserts to brake rotors may undergo fatigue due to the cyclic vibrations and stresses which occur over repeated braking operations. This may lead to rivet failure and compromise of the attachment between the drive insert and the brake disc, as well as the presence of loose hardware floating within the brake system. Additionally, rivets and other through-fasteners may necessarily require a hole through the surface of a brake disc, which can compromise the surface integrity of the brake disc and potentially create stress concentrations around the hole when the brake disc is subjected to a braking load, and/or as the rivet tail expands within the rivet hole during installation to provide a fastening function. The drive insert disclosed herein is configured to mechanically engage the brake disc to substantially secure the drive insert against movements relative to the brake disc in the radial, axial, and tangential directions of the brake disc without requiring additional fasteners (e.g., rivets). However, additional fasteners can be used in some cases if desired.

As used herein, an axial direction of a brake disc means a direction substantially parallel to a disc axis A (FIG. 1) about which the brake disc is configured to rotate. A radial direction of the brake disc means a direction substantially parallel to a radial distance in a cylindrical coordinate system when the disc axis A is the cylindrical axis in the cylindrical coordinate system. A tangential direction of the brake disc means a direction perpendicular to the axial direction and perpendicular to the radial direction.

In some examples, the drive insert is configured to mechanically engage a rotor brake disc within a disc stack of a brake system configured to decelerate a vehicle wheel. The wheel may include a plurality of rotor drive keys, each rotor drive key being configured to extend through a drive slot on the perimeter of the rotor disc. At least a part of the drive insert is configured to position between a rotor drive key and a drive slot, such that forces transmitted between the rotor drive key and the drive slot transmit through a portion of the drive insert. For example, the rotor drive key may rotationally couple the wheel and the rotor disc, such that the rotor disc rotates substantially synchronously with the wheel. When the brake system compresses the disc stack, the rotor disc frictionally engages a stator disc configured to remain substantially stationary with respect to the wheel, generating shearing forces and transmitting a torque from the rotor disc to the rotor drive key opposing the rotation of the wheel. The drive insert may mechanically engage the brake disc to substantially secure the drive insert (relative to the brake disc) as the rotor disc transmits the opposing torque through the rotor drive key.

In examples described herein, the drive insert includes a first clip, a second clip, and a retainer. The first clip is configured to engage a first drive slot of the brake disc. For example, the first clip may be configured to slide over a first surface of a brake disc, e.g., in a first tangential direction of the brake disc, where the first surface is adjacent to the first drive slot on the outer perimeter of the brake disk. The second clip is configured to engage a second drive slot of the brake disc, e.g., adjacent to the first drive slot. The second clip may be configured to slide over a second surface of a brake disc, where the second surface is adjacent to the second drive slot on the outer perimeter of the brake disk. For example, the second clip may be configured to slide over the second surface in a second tangential direction of the brake disc opposite the first tangential direction. The retainer is configured to be slidable over the first clip and the second clip when the first clip is positioned over the first surface and the second clip is positioned over the second surface to secure the first and second clips to the brake disc.

In some examples, the first clip and/or the second clip are configured to couple to the brake disc in a manner that minimizes or even prevents movement relative to the brake disc in a radial direction of the brake disc. For example, a clip (e.g., the first clip and/or the second clip) can define a gap (e.g., between a first arm and a second arm) configured to receive a portion of the brake disc when the clip is positioned on the brake disc. The clip may be configured to substantially conform to a cross-sectional profile of the brake disc to substantially secure the drive insert against movement in the radial direction of the brake disc when the gap defined by the clip receives the portion of the brake disc. For example, the brake disc may be configured such that a cross-sectional profile in a plane defined by the radial and axial directions of the brake disc flares outward as a radius defined by the brake disc increases. The clip may be configured to substantially conform to the cross-sectional profile when positioned over the surface of the brake disc, such that the outward flare of the cross-sectional profile helps minimize movement of the clip relative to the brake disc in the radial direction relative to the brake disc.

In addition to or instead of minimizing or preventing movement relative to the brake disc in a radial direction of the brake disc, the first clip and/or the second clip may be configured to secure the drive insert relative to the brake disc to minimize or even prevent movement of the drive insert relative to the brake disc in an axial direction of the brake disc. For example, a clip (e.g., the first clip and/or the second clip) may be configured to mechanically engage a first side of the brake disc (e.g., the side defining the first surface) and mechanically engage a second side of the brake disc opposite the first side. As an example, the clip may be configured to mechanically engage the first side and the second side when the gap defined by the clip receives the portion of the brake disc. The clip may wrap around the brake disc from the first side to the second side as a portion of the clip extends through the respective drive slot of the brake disc. The clip may be configured such that, when the clip experiences movement in the axial direction of the brake disc, the clip encounters the first side and/or second side of the brake disc to substantially cease continued movement in the axial direction.

The retainer is configured to secure the first clip and the second clip against movement relative to the wheel in a tangential direction of the wheel. The retainer is configured to extend from the first clip to the second clip when the first clip is positioned within a first drive slot and the second clip is positioned within a second drive slot. For example, the retainer may extend from the first clip to the second clip over a portion of the perimeter of the brake disc. The retainer is configured to limit tangential movement of the first clip relative to the second clip (or vice-versa), such that the first clip and second clip are substantially secured against tangential movement relative to the brake disc. In some examples, the retainer is configured to mechanically engage a bearing surface of a clip (e.g., the first clip or the second clip) when the clip is caused to move in a tangential direction of the brake disc. The retainer may be configured to exert a reaction force opposite the tangential direction on the clip to limit the movement. In some examples, the drive insert is configured such that the first clip limits movement of the retainer and the second clip in a first tangential direction, and the second clip limits movement of the retainer and the first clip in a second tangential direction, such that the drive insert (e.g., the first clip, the second clip, and the retainer) is substantially secured from movement in either the first tangential direction or the second tangential direction.

Hence, the drive inserts described herein can be configured to mechanically engage a brake disc to help secure the drive insert against movements relative to the brake disc in the radial, axial, and tangential directions of the brake disc without requiring additional fasteners (e.g., rivets). As discussed above, the first clip and/or second clip may be configured to secure the drive insert against movement relative to the brake disc in radial and axial directions of the brake disc and the retainer may be configured to secure the drive insert against movement relative to the brake disc in the tangential direction of the brake disc.

The drive insert can be configured to mechanically engage a rotor drive key configured to rotationally couple the brake disc and a vehicle wheel. The drive insert may be configured to mechanically engage a rotor brake disc as rotor brake disc transmits a torque opposing wheel rotation through the drive insert (e.g., as a result of shearing forces generated by contact with a stator disc).

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A. An axial direction A1 of wheel 10 is parallel to the axis of rotation A.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in the axial direction A1 of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation A, each of the rotor drive keys (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. Rotor drive keys 32 may be configured to receive a torque from a brake system (not shown) configured to reduce and/or cease a rotation of wheel 10. Rotor drive keys 32 may be integrally formed with interior surface 16, or may be separate from and mechanically affixed to interior surface 16.

Figure 2:
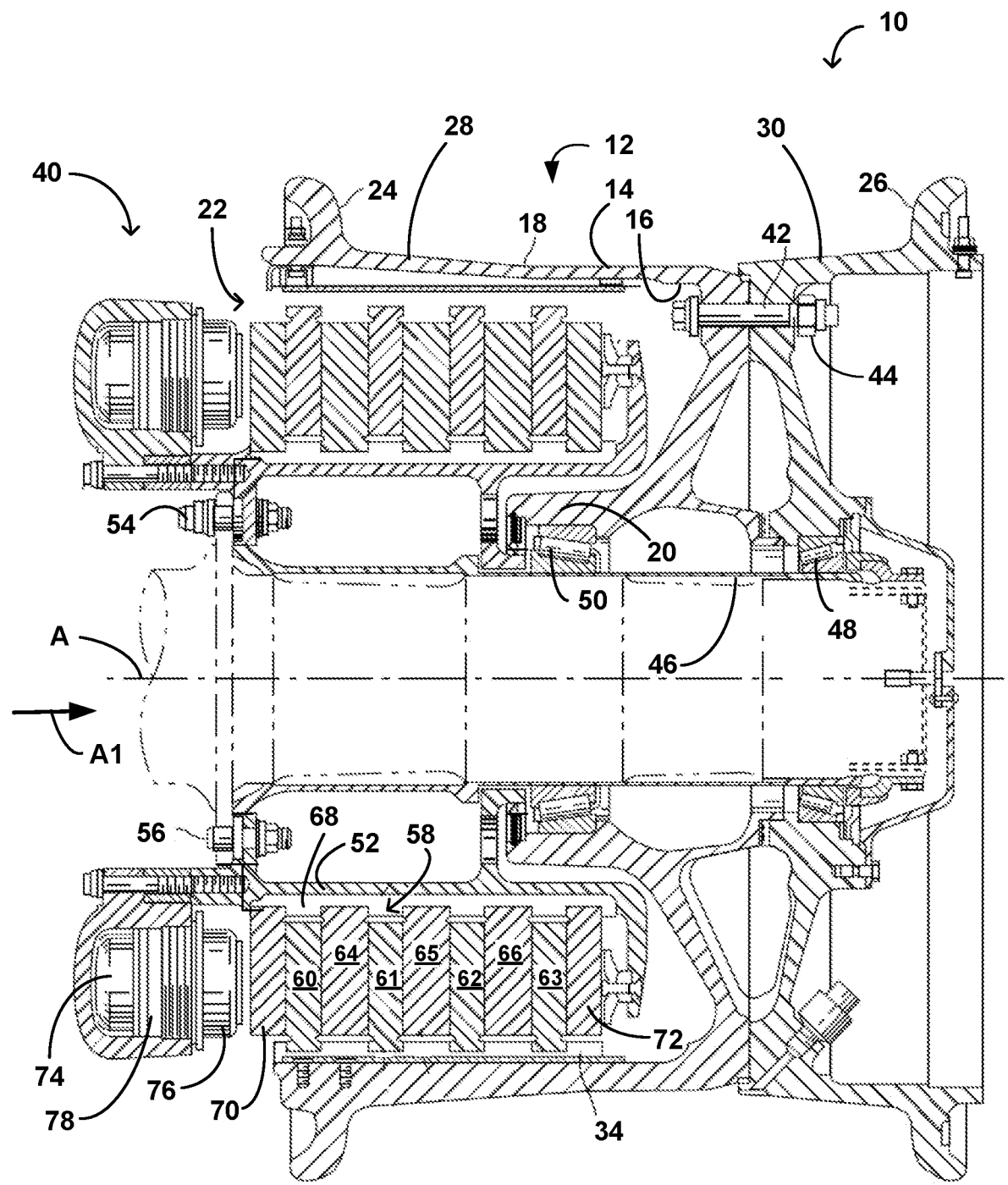
FIG. 2 is a schematic cross-sectional view of an example wheel and brake system including the wheel of FIG. 1.

FIG. 2 is a schematic cross-sectional view illustrating wheel 10 and an example brake system 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples. Wheel 10 and brake system 40 is shown and described to provide context to the example drive inserts described here. The drive inserts described herein, however, may be used with any suitable wheel and brake system in other examples.

Wheel 10 is configured to rotate about axis A extending through axial assembly 46. Axial assembly 46 is figured to support wheel 10 while allowing wheel 10 to rotate around axis A using bearing 48 and bearing 50. For example, bearings 48, 50 may define a substantially circular track around axial assembly 46. A torque tube 52 is coupled to axial assembly 46 (e.g., via bolts 54, 56), such that torque tube 52 remains substantially stationary when wheel 10 rotates around axial assembly 46 and axis A. Torque tube 52 may at least partially surround an exterior of axial assembly 46. Axial assembly 46 may be mechanically coupled to a structure (e.g., a strut) attached to a vehicle.

In the example shown in FIG. 2, brake system 40 is positioned within wheel 10 and is configured to engage torque tube 52 and rotor drive key 34. Brake system 40 is configured to generate a torque to oppose a rotation of wheel 10 around axis A and transfer the torque to rotor drive key 34, reducing and/or eliminating the rotation of wheel 10 around axis A. Brake system 40 includes a disc stack 58 which includes one or more rotor discs (e.g., rotor discs 60, 61, 62, 63) and one or more stator discs (e.g., stator discs 64, 65, 66). Rotor discs 60, 61, 62, 63, and/or stator discs 64, 65, 66, may have any suitable configuration. For example, rotor discs 60, 61, 62, 63 and/or stator discs 64, 65, 66 can each be substantially annular discs surrounding axial assembly 46. Stator discs 64, 65, 66 are coupled to torque tube 52 via spline 68 and remain rotationally stationary with respect to torque tube 52 (and axial assembly 46) as wheel 10 rotates. Rotor discs 60, 61, 62, 63 are rotationally coupled to rotor drive key 34 and interior surface 16 and rotate substantially synchronously with wheel 10 around axis A. For example, rotor drive key 34 may be configured to extend through a drive slot on a perimeter of one or more of rotor discs 60, 61, 62, 63 to cause rotor discs 60, 61, 62, 63 to rotate substantially synchronously with wheel 10. Disc stack 58 may include any number of rotor discs and stator discs.

Rotor discs 60, 61, 62, 63, and/or stator discs 64, 65, 66, may be configured to provide opposing friction surfaces for braking a vehicle, such as an aircraft. Compression of disc stack 58 (e.g., between pressure plate 70 and backing plate 72) may bring the opposing friction surfaces into contact, generating shearing forces between the rotor discs rotating substantially synchronously with wheel 10 and the stator discs remaining substantially stationary with respect to torque tube 52. The shearing forces may cause a rotor disc (e.g., rotor discs 60, 61, 62, 63) engaged with rotor drive key 34 to impart a torque on rotor drive key 34 opposing the rotation of wheel 10. The rotor disc may impart the opposing torque to rotor drive key 34 using the drive slot through which rotor drive key 34 extends.

In examples, the rotor disc (e.g., rotor discs 60, 61, 62, 63) includes a drive insert positioned within the drive slot. The drive insert may be configured to transmit the opposing torque from the rotor disc to rotor drive key 34. For example, the drive insert may be configured such that some portion of the drive insert resides within the drive slot of the brake disc and is positioned between the drive slot and the brake disc. The drive insert is configured to allow the rotor disc to translate in a direction substantially parallel to axis A when disc stack 58 is compressed. The drive insert may be configured to help protect the rotor disc (or other brake disc in other examples) against, for example, the mechanical stresses borne by the drive slot of the rotor disc when the rotor disc imparts the opposing torque to rotor drive key 34 (e.g., during the braking of wheel 10).

An actuator 74 is configured to compress disc stack 58 to bring the opposing friction surfaces of rotor discs 60, 61, 62, 63 into contact with friction surfaces of stator discs 64, 65, 66. Actuator 74 may be configured to cause a piston 76 to translate relative to a body 78 of actuator 74 to compress disc stack 58. Actuator 74 may cause piston 76 to translate using any suitable method. In some examples, actuator 74 is configured to cause translation of piston 76 by supplying and/or venting a pressurized hydraulic fluid to or from a piston chamber. In addition or instead, in some examples, actuator 74 is configured to cause piston 76 to translate through a motion (e.g., a rotary motion) generated by an electric motor.

Wheel 10 may be used with any variety of private, commercial, or military aircraft or other type of vehicle. Wheel 10 may be mounted to a vehicle via, for example, axial assembly 46, or some other appropriate arrangement to allow wheel 10 to rotate around axis A. Axial assembly 46 may be mounted on a strut of a landing gear (not shown) or other suitable component of a vehicle to connect wheel 10 to the vehicle. Wheel 10 may rotate around axis A and axial assembly 46 to impart motion to the vehicle. Wheel 10 is shown and described to provide context to the brake system described herein, however the brake system described herein may be used with any suitable wheel assembly in other examples.

Figure 3:
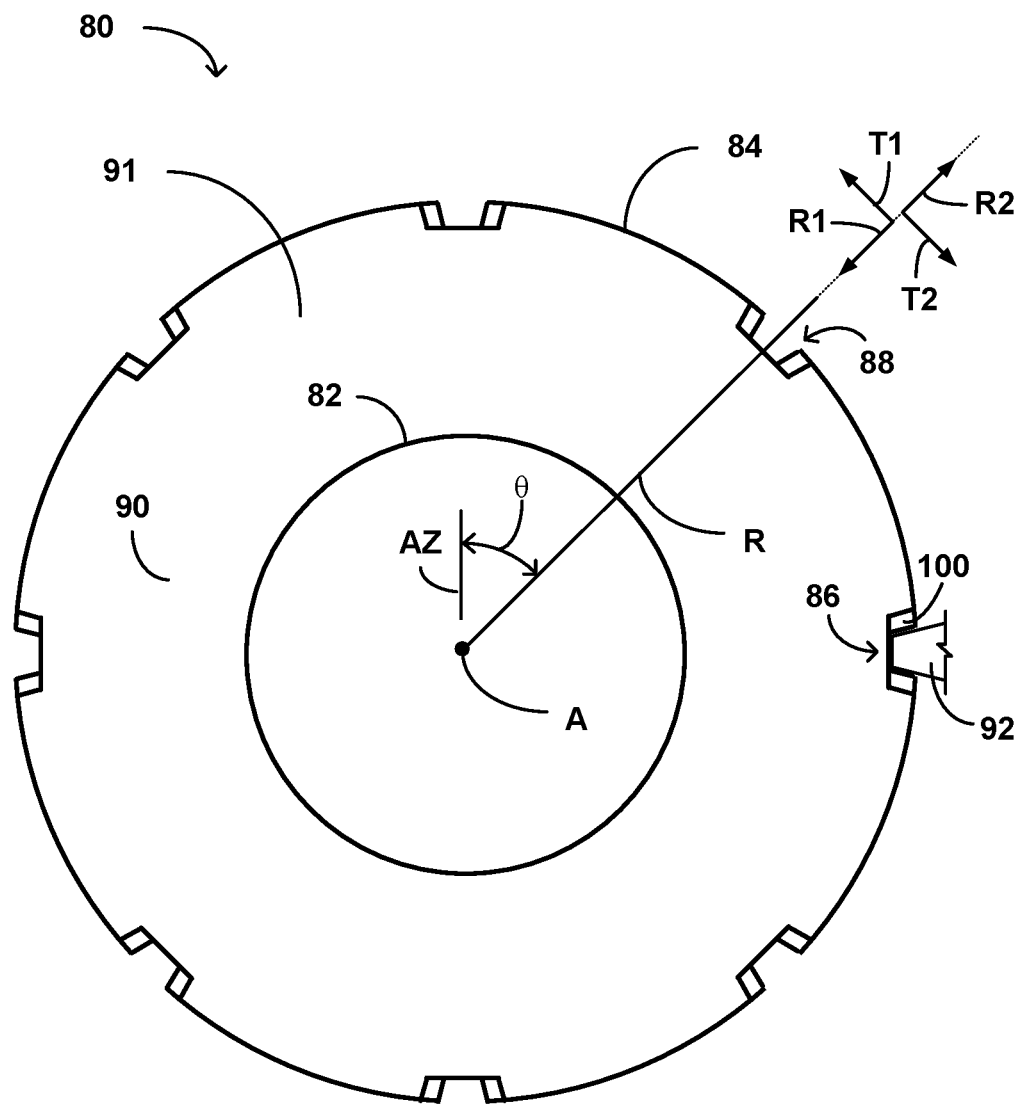
FIG. 3 is a plan view illustrating an example brake disc having a plurality of drive slots.

FIG. 3 is a diagram illustrating an example brake disc 80, which may be an example of one or more brake discs within disc stack 58 (FIG. 2). For example, brake disc 80 may be an example of one or more of rotor discs 60, 61, 62, 63 (FIG. 2). Brake disc 80 defines a central aperture 82 extending through brake disc 80. Central aperture 82 is configured to allow rotation of brake disc 80 around an axis A illustrated perpendicular to the page. Brake disc 80 further defines a plurality of drive slots around an outer perimeter 84 of brake disc 80 ("disc outer perimeter 84"). The plurality of drive slots comprises, for example, drive slot 86 and drive slot 88, as well as others similarly depicted. Brake disc 80 further includes friction surface 90 on a first side 91 of brake disc 80 ("disc first side 91"), and may include a second friction surface (not shown) on a side opposite disc first side 91.

Brake disc 80 is configured to rotate substantially around axis A. A radial direction R intersects and is perpendicular to the axis A. Inward radial direction R1 of brake disc 80 is a first vector coincident with radial direction R and having a direction toward axis A. An outward radial direction R2 is a second vector having a direction opposite the first vector. A first tangential direction T1 of brake disc 80 is a third vector defining a 90 degree angle from the first vector defining the inward radial direction R1. A second tangential direction T2 is a fourth vector opposite the third vector. In FIG. 3, the radial direction R is illustrated as defining an angle θ with an reference axis AZ. The radial direction may be oriented with respect to brake disc 80 to define any angle θ with reference axis AZ. For example, a specific radial direction R may define an angle θ causing the radial direction R to intersect drive slot 88, drive slot 86, any other drive slot on brake disc 80, any point on disc outer perimeter 84, or any point on brake disc 80. The inward radial direction R1, the outward radial direction R2, the first tangential direction T1, and the second tangential direction T2 may be defined with respect to the specific radial direction R.

The plurality of drive slots such as 86, 88 are configured to accommodate the extension of a plurality of drive keys, such as the plurality of rotor drive keys 32 (FIG. 1), through drive slots 86, 88. For example, FIG. 3 illustrates a portion of a rotor drive key 92 extending through drive slot 86. Rotor drive key 92 may be a rotor drive key within the plurality of rotor drive keys 32 (FIG. 1), such as rotor drive key 34 (FIG. 2). Drive slot 86 may be configured such that rotor drive key 92 extends through drive slot 86 in an axial direction of brake disc 80 (e.g., a direction substantially parallel to axis A, e.g., parallel or nearly parallel to the extent permitted by manufacturing tolerances). One or more of the drive slots (e.g., a subset of the drive slots or all of the drive slots) defined by brake disc 80 may have a portion of a respective rotor drive key extending through the drive slot in a manner similar to that depicted for drive slot 86 and rotor drive key 92.

Rotor drive key 92 is configured such that, when rotor drive key 92 rotates synchronously with a wheel (e.g., wheel 10 (FIGS. 1 and 2), rotor drive key imparts a force on brake disc 80 in a tangential direction of brake disc 80 (e.g., in first tangential direction T1 or second tangential direction T2) to cause rotation of brake disc 80 around axis A. Brake disc 80 is configured such that, when a shearing force generates on friction surface 90 (e.g., due to frictional engagement with a stator disc), drive slot 86 imparts a force on rotor drive key 92 (e.g., in first tangential direction T1 or second tangential direction T2) which opposes the synchronous rotation of rotor drive key 92 with wheel 10.

One or more (e.g., all) of the plurality of drive slots defined by brake disc 80, including slots 86, 88, may be reinforced by a drive insert, such as drive insert assembly assembly 100 within drive slot 86. While drive insert assembly 100 and drive slot 86 are primarily referred to in the description of FIG. 3 as well as other figures, the description of drive insert assembly 100 and drive slot 86 may apply to the other drive slots and drive inserts of brake disc 80 and other brake discs described herein. Additionally, while brake disc 80 is primarily referred to in the description of FIG. 3 as well as other figures, the drive inserts described herein may also be utilized on a drive slot of a stator brake disc, such as one or more of stator brake discs 64, 65, 66 (FIG. 2).

Drive insert assembly 100 is configured to minimize or even eliminate the extent to which rotor drive key 92 engages directly with a surface of brake disc 80 during a braking operation. Drive insert 100 may be configured to provide a sliding and a bearing surface to act against rotor drive key 92 during braking operations, such that drive insert assembly 100 minimizes or even eliminates the engagement. Drive insert assembly 100 is configured to substantially cover certain areas (e.g., all or part) of drive slot 86 and is configured to install on brake disc 80 such that drive insert assembly 100 is between rotor drive key 92 and drive slot 86 when drive slot 86 imparts tangential forces to rotor drive key 92 during braking operations, and/or when rotor drive key 92 imparts tangential forces to drive slot 86 to drive rotation of brake disc 80. Drive insert assembly 100 is configured to provide for secure placement within drive slot 86 in the axial, radial, and tangential directions of brake disc 80, in order to maintain a substantially fixed position relative to drive slot 86 as brake disc 80 rotates during rotation of wheel 10 (FIGS. 1 and 2). Drive insert assembly 100 is configured to relatively securely mechanically couple to brake disc 80 in the absence of rivets (e.g., rivetless) or other fastening mechanisms penetrating brake disc 80. The use of drive insert assembly 100 may reduce wear of drive slot 86 as rotor drive key 92 loads drive slot 86 over repeated braking operations.

Figure 4:
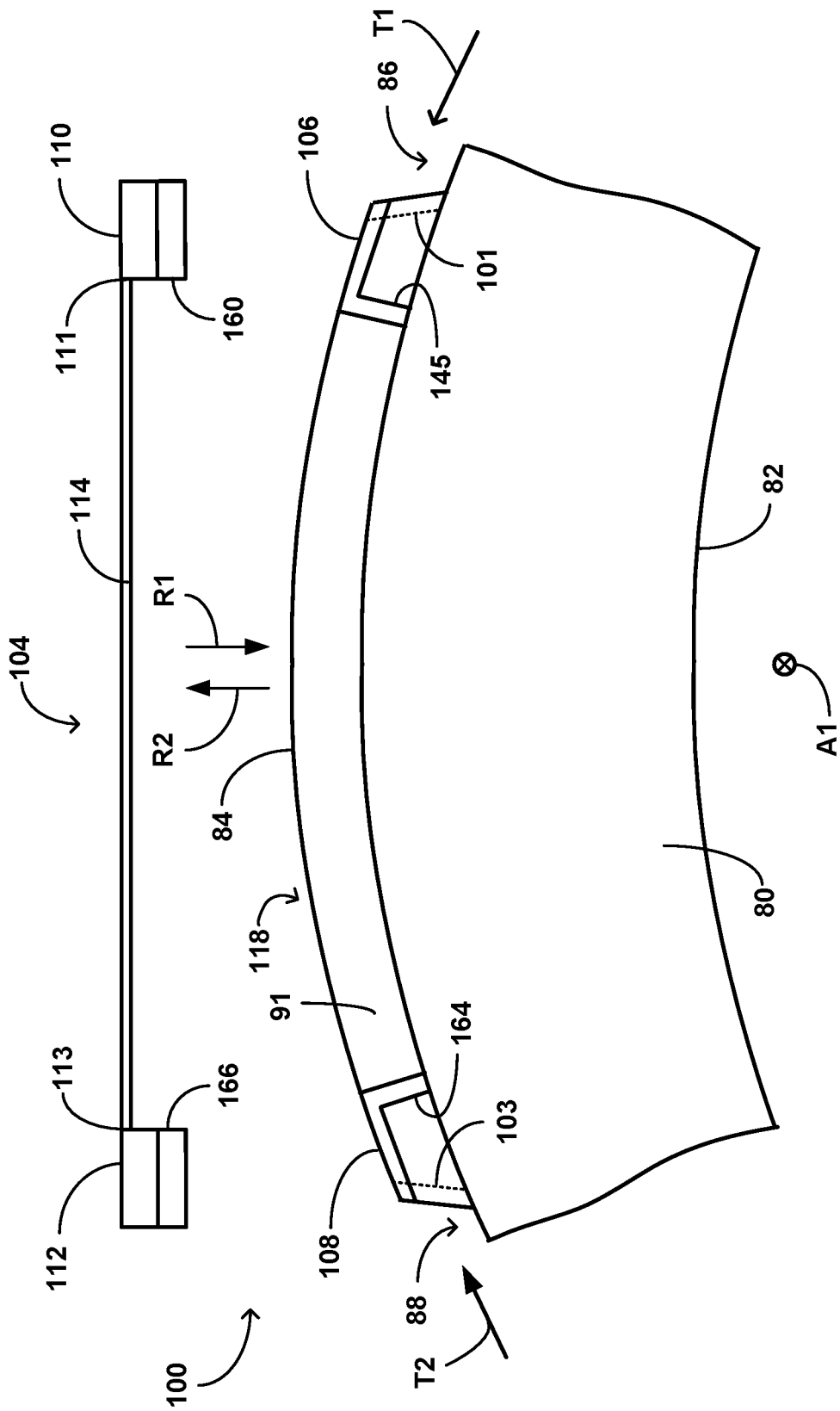
FIG. 4 is a schematic view of an example drive insert and a portion of an example brake disc.
Figure 5:
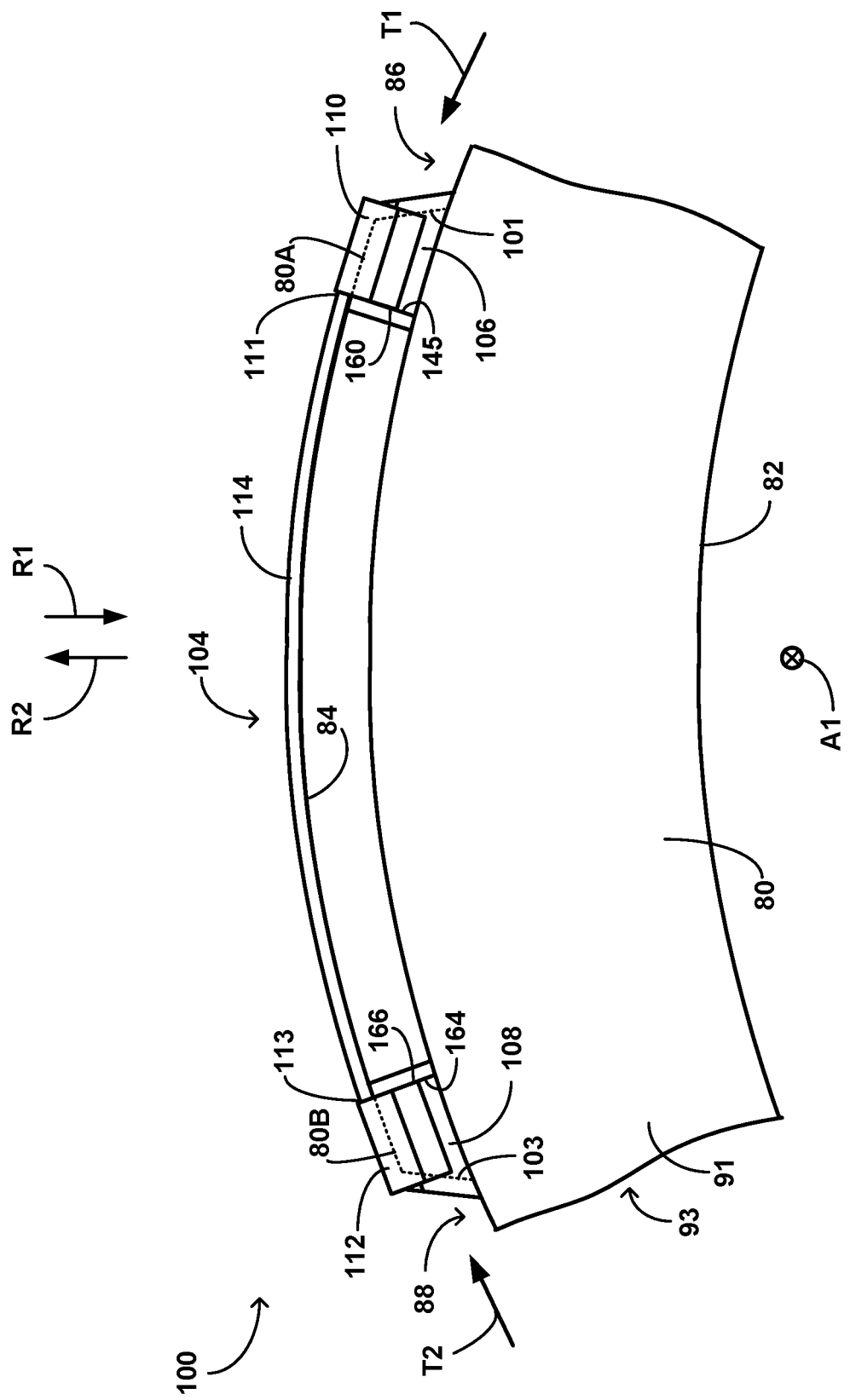
FIG. 5 is a schematic view of the drive insert of FIG. 4 positioned on the brake disc.

FIG. 4 and FIG. 5 illustrate an example drive insert assembly 100 comprising a retainer 104, a first clip 106, and a second clip 108. FIG. 4 is a partially exploded view, showing retainer 104 separated from first and second clips 106, 108, which are positioned on a portion of brake disc 80. First clip 106 is positioned substantially over an edge 101 (shown in dashed lines) of drive slot 86. First clip 106 is configured to position within drive slot 86 by slidably translating over brake disc 80 in the first tangential direction T1. Second clip 108 is positioned substantially over edge 103 (shown in dashed lines) of drive slot 88. Second clip 108 is configured to position with drive slot 88 by slidably translating over brake disc 80 in the second tangential direction T2. Retainer 104 is configured to slide over (e.g., in the inward radial direction R1) and mechanically engage first clip 106 and second clip 108 when first clip 106 and second clip 108 are positioned on brake disc 80 in the respective drive slots 86, 88. The axial direction A1 is perpendicular to the page. In FIGS. 4 and 5, the axial direction A1 is shown proceeding into the page, although this is not required. The axial direction A1 may proceed out of the page in other examples.

FIG. 5 illustrates retainer 104 positioned over first clip 106 and second clip 108 while first clip 106 and second clip 108 are positioned in the respective drive slots 86, 88 of brake disc 80. Example portions 80A and 80B of brake disc 80 are illustrated in dashed lines for reference. Portion 80A includes edge 101 and portion 80B includes edge 103. In some examples, retainer 104 includes a first end section 110 configured to mechanically engage first clip 106 and a second end section 112 configured to mechanically engage second clip 108. First end section 110 may be mechanically engaged (e.g., attached) to a first end 111 of retainer 104. Second end section 112 may be mechanically engaged (e.g., attached) to a second end 113 of retainer 104 opposite first end 111. As shown in FIG. 5, in some examples, retainer 104 is configured to substantially conform to disc outer perimeter 84 when retainer 104 mechanically engages first clip 106 and second clip 108. For example, retainer 104 may be relatively flexible and configured to take on the shape of disc outer perimeter 84 when retainer 104 is positioned over outer perimeter 84. In other examples, retainer 104 may be rigid and preformed to have a shape that conforms to disc outer perimeter 84, even when retainer 104 is not positioned over disc outer perimeter 84.

First clip 106 is configured to engage brake disc 80 to limit movement of first clip 106 relative with brake disc 80 in the first tangential direction T1, and to limit movement of first clip 106 relative to brake disc 80 in the inward radial direction R1 and the outward radial direction R2. Second clip 108 is similarly configured to engage brake disc 80 to limit movement of second clip 108 relative to brake disc 80 in at the second tangential direction T2, and to limit movement of second clip 108 relative to brake disc 80 in the inward radial direction R1 and the outward radial direction R2. In examples, first clip 106 and/or second clip 108 are configured to engage disc first side 91 and engage a second side 93 of brake disc 80 ("disc second side 93") opposite disc first side 91 to, for example, limit movement of the respective clip in an axial direction A of brake disc 80.

Retainer 104 includes medial section 114 extending between first and second end sections 110, 112. When retainer 104 mechanically engages first clip 106 and second clip 108 (e.g., as shown in FIG. 5), retainer 104 is configured such that a medial section 114 limits movement of retainer 104 relative to brake disc 80 in the tangential directions T1, T2. Further, when retainer 104 mechanically engages first clip 106 and second clip 108, retainer 104 may limit movement of first clip 106 relative to brake disc 80 in the second tangential direction T2, and limit movement of second clip 108 relative to brake disc 80 in the first tangential direction T1. Hence, first clip 106, second clip 108, and retainer 104 are configured to position on brake disc 80 to limit relative motion between drive insert assembly 100 and brake disc 80 in the inward radial direction R1, the outward radial direction R2, the first tangential direction T1, the second tangential direction T2, and the axial direction of brake disc 80. In examples described herein, "limits movement" or the like may refer to preventing movement or reducing movement.

Further, first clip 106, second clip 108, and retainer 104 are configured to mechanically engage brake disc 80 and/or another portion of drive insert assembly 100 such that drive insert assembly 100 can be substantially secured relative to disc 80 without requiring a fastener (e.g., a rivet) or other element that penetrates through drive insert assembly 100 and into brake disc 80.

Medial section 114 of retainer 104 may be an elongated member that extends from first section 110 to second section 112. Together, first section 110, second section 112, and medial section 114 have a length that enables retainer 104 to extend from a first drive slot 86 of brake disc 80 to a second drive slot 88 of brake disc 80. In some examples, as shown in FIG. 5, first drive slot 86 is circumferentially adjacent to second drive slot 88 (e.g., there are no intervening drive slots on disc outer perimeter 84 between the first drive slot and the second drive slot.) In other examples, however, one or more drive slots may be positioned between first and second drive slots 86, 88. Retainer 104 may be configured to substantially match a curvature of some portion of disc outer perimeter 84 (e.g., the portion between drive slot 86 and drive slot 88). In examples, medial section 114 is configured to flex (e.g., elastically and/or plastically deform) to substantially match the curvature when first end section 110 is positioned over first clip 106 and second end section 112 is positioned over second clip 108. In some examples, retainer 104 has a pre-set curvature substantially matching the curvature of the portion of outer perimeter 84.

In some examples, first end section 110, second end section 112, and/or medial section 114 are formed to be physically separate from each other and subsequently attached to define drive insert assembly 100. In other examples, first end section 110, second end section 112, and/or medial section 114 have a unitary body construction, e.g., are formed to be one piece. For example, first end section 110, second end section 112, and/or medial section 114 may be configured as a single piece formed from, for example, sheet metal stock. Configuring first end section 110, second end section 112, and/or medial section 114 as a single piece may reduce and/or eliminate a need for mechanical joints arising from welds, rivets, and/or other fastening methods. Such mechanical joints may be compromised under the vibrational and other conditions which arise during braking operations of brake system 40 (FIG. 2), potentially reducing the durability of drive insert assembly 100.

As shown in FIG. 5, retainer 104 may be configured to substantially cover a portion of disc outer perimeter 84 when drive insert assembly 100 is installed on brake disc 80. In this way, retainer 104 may help protect disc outer perimeter 84 during installation and/or operation of brake disc 80 in brake system 40, or during other periods. For example, retainer 104 may be configured to absorb some or substantially all of an impact force on retainer 104, such that retainer 104 transmits a reduced force (or substantially no force) to brake disc 80 as a result of the impact. Retainer 104 may be configured to protect disc outer perimeter 84 against scratches, abrasion, cuts, and other events which might impact a surface integrity of disc outer perimeter 84. In examples, retainer 104 is configured to protect disc outer perimeter 84 against oxidation or other processes. For example, retainer 104 may be configured to engage (e.g., frictionally engage) a portion of disc outer perimeter 84 when installed on brake disc 80, such that retainer 104 limits direct exposure of disc outer perimeter 84 to an environment surrounding brake disc 80.

FIGS. 6 and 7 illustrate additional details of drive insert assembly 100 and an example of how drive insert assembly 100 may connect to brake disc 80. FIG. 6 illustrates a section of brake disc 80 and a section of drive slot 86 defined by brake disc 80. FIG. 7 illustrates a portion of an example drive insert assembly 100 illustrating a portion of retainer 104 with first end section 110 and medial section 114, and illustrating first clip 106. Inward radial direction R1, outward radial direction R2, first tangential direction T1, second tangential direction T2, and axial direction A1 are illustrated for reference. FIG. 7 can be, for example, an exploded perspective view of first clip 106 and part of retainer 104. While FIG. 6 and FIG. 7 are discussed mainly with reference to drive slot 86, first end section 110, and first clip 106, drive slot 88 and other drive slots of brake disc 80 may be configured similarly to drive slot 86, second end section 112 of retainer 104 may be configured similarly to first end section 110, and second clip 108 may be configured similarly to first clip 106.

Drive slot 86 includes a torque face 102, which may be positioned along disc outer perimeter 84. Torque face 102 defines a portion of drive slot 86 and is configured to bear a tangential force (e.g., in the second tangential direction T2) imparted by a rotor drive key (e.g., rotor drive key 92 (FIG. 3)) during a braking operation. Torque face 102 may have any suitable orientation relative to the radial directions R1, R2 and the tangential directions T1, T2. In some examples, torque face 102 slants with respect to the inward radial direction R1, such that a vector parallel to torque face 102 defines a slope $\Delta R1/\Delta T1$, where $\Delta R1$ is the absolute value of a displacement in the inward radial direction R1 and $\Delta T1$ is the absolute value of a displacement in a direction parallel to the first tangential direction T1.

Brake disc 80 includes a first surface 118 and a rear surface 117 adjacent to drive slot 86 and facing in an opposite direction from first surface 118. First surface 118 may be defined by disc first side 91 and rear surface 117 may be defined by disc second side 93. In some examples, torque face 102, disc outer perimeter 84, and or other portions of brake disc 80 separate first surface 118 and rear surface 117. In some examples, first surface 118, rear surface 117, and/or torque face 102 are configured to help secure first clip 106 against movement in the outward radial direction R2 when first clip 106 is positioned on brake disc 80. For example, brake disc 80 may be configured to define a displacement D1 between first surface 118 and rear surface 117 and/or on torque face 102. The displacement D1 may be substantially parallel to the axis A of brake disc 80. Brake disc 80 may be configured such that the displacement D1 increases in the outward radial direction R2, such that first surface 118, rear surface 117, and/or torque face 102 substantially flare outwards in an axial direction as a radial distance from the axis A increases.

In some examples, brake disc 80 includes a ledge 121 defining a surface configured to face toward the outward radial direction R2. Ledge 121 may be configured to limit movement of a clip (e.g., first clip 106 or second clip 108) in the inward radial direction R1 when the clip contacts ledge 121. In examples, ledge 121 is configured to form a corner (e.g., a substantially sharp or rounded corner) with first surface 118. In some examples, ledge 121 may be substantially perpendicular to disc first side 91 and/or disc second side 93. Brake disc 80 may include a rear ledge 123. Rear ledge 123 may be configured relative to rear surface 117 and/or brake disc 80 in the same manner as ledge 121 relative to first surface 118 and/or brake disc 80.

In some examples, brake disc 80 includes a step 125 defining a surface configured to face toward the second tangential direction T2. In examples, step 125 is configured to form a corner (e.g., a substantially sharp or rounded corner) with first surface 118 and/or ledge 121. In some examples, step 125 may be substantially perpendicular to ledge 121 and/or substantially perpendicular to disc first side 91 and/or disc second side 93. Brake disc 80 may include a rear step 127. Rear step 127 may be configured relative to rear surface 117, rear ledge 123, and/or brake disc 80 in the same manner as step 125 relative to first surface 118, ledge 121, and/or brake disc 80.

Drive insert assembly 100 is configured to secure within drive slot 86 of brake disc 80. Drive insert assembly 100 is configured to install on brake disc 80 such that drive insert assembly 100 is between a rotor drive key (e.g., rotor drive key 92) and drive slot 86 when brake disc 80 is installed on a wheel 10. For example, first clip 106 can be configured to position between torque face 102 and rotor drive key 92 when brake disc 80 is installed on wheel 10. Thus, drive insert assembly 100 is between rotor drive key 92 and drive slot 86 when drive slot 86 imparts tangential forces to rotor drive key 92 during braking operations, and/or when rotor drive key 92 imparts tangential forces to drive slot 86 to cause a rotation of brake disc 80. Drive insert assembly 100 is configured to reinforce drive slot 86 to help minimize any adverse effects to brake disc 80 from rotor drive key 92 imparting forces to drive slot 86, or from drive slot 86 imparting forces to rotor drive key 92.

First clip 106 is configured to be slidable over a surface of brake disc 80 in the first tangential direction T1 of the brake disc 80, where the surface of the brake disc 80 is adjacent to drive slot 86 on disc outer perimeter 84. For example, first clip 106 may be configured to slide over first surface 118 of brake disc 80 in the first tangential direction T1. Retainer 104 (e.g., first end section 110) is configured to be slidable over first clip 106 when first clip 106 is positioned over first surface 118 (or other surface in other examples). For example, first end section 110 may be configured to slide over first clip 106 in the inward radial direction R1 when first clip 106 is positioned over first surface 118 to place retainer 104 into position relative to first clip 106 to help hold first clip 106 in place relative to brake disc 80. As shown in FIG. 7, retainer 104 defines a channel 119 configured to receive first clip 106 when retainer 104 slides over first clip 106 in the inward radial direction R1. Retainer 104 may act to secure first clip 106 to brake disc 80 in order to minimize axial, radial, and/or tangential movements of clip 106 relative to brake disc 80.

In the example shown in FIG. 7, first clip 106 includes a body section 120 comprising a drive face 122 and a back face 124. Drive face 122 and back face 124 are surfaces of body section 120. Back face 124 is opposite drive face 122, such that some portion of body section 120 separates back face 124 and drive face 122. Back face 124 may be configured to engage torque face 102 of brake disc 80 when clip 106 is positioned over first surface 118 of brake disc 80. First clip 106 may include first arm 126 extending from body section 120. First clip 106 may be configured such that first arm 126 at least partially covers first surface 118 when body section 120 (e.g., back face 124) is engaged with (e.g., directly or indirectly contacting) brake disc 80. In some examples, there may be a displacement between body section 120 and brake disc 80 when first arm 126 at least partially covers first surface 118.

Drive face 122 and back face 124 may be non-intersecting surfaces of body section 120. In examples, back face 124 is configured to engage (e.g., frictionally engage) torque face 102 of brake disc 80 when clip 106 is positioned over first surface 118. In some examples, back face 124 is configured to fully or partially conform (e.g., to define a mating surface or otherwise conform) to torque face 102 when clip 106 is positioned over first surface 118. In some examples, torque face 102 defines a torque face surface area and back face 124 define a back face surface area. When clip 106 is positioned over first surface 118, back face 124 may contact at least 70% of the torque face surface area, in other examples, at least 80%, and in other examples, at least 90%, such as 100% or nearly 100% to the extent permitted by manufacturing tolerances.

First clip 106 is configured to mechanically engage disc first side 91 and disc second side 93 when back face 124 engages torque face 102 and/or first arm 126 engages first surface 118. For example, as shown in FIG. 7, first clip 106 may be configured to substantially wrap around brake disc 80 from disc first side 91 to disc second side 93 as a portion of first clip 106 (e.g., body section 120) extends through drive slot 86 of brake disc 80. In examples, first clip 106 defines a gap G configured to receive a portion of brake disc 80 when first arm 126 slides over first surface 118 in the first tangential direction T1. The gap G may be configured to cause first clip 106 to engage disc first side 91 and disc second side 93 when first clip 106 is positioned on brake disc 80. In examples, first clip 106 is configured such that, when first clip 106 receives the portion of brake disc 80 within gap G, the displacement D1 causes first surface 118 and/or rear surface 117 to help secure first clip 106 against movement in the outward radial direction R2, e.g., by helping first clip 106 resist movement away from brake disc 80 in the outward radial direction R2.

First clip 106 may be configured such that, when first clip 106 receives the portion of brake disc 80 within gap G, first clip 106 is positioned to encounter ledge 121 and/or rear ledge 123 when a force is exerted on first clip 106 in the inward radial direction R1 (e.g., a gravity or other force), such that ledge 121 and/or ledge 123 help first clip 106 resist movement in the inward radial direction R1. First clip 106 may be configured such that first clip 106 contacts step 125 and/or rear step 127 when first clip 106 receives the portion of brake disc 80 within gap G.

As shown in FIG. 7, first clip 106 may include a second arm 128 extending from body section 120. First clip 106 defines the gap G between first arm 126 and second arm 128. For example, first arm 126 can include a first arm interior wall 130 and second arm 128 can include a second arm interior wall 132 generally facing first arm interior wall 130, and first arm interior wall 130 and second arm interior wall 132 can define the gap G.

In some examples, second arm 128 is configured to engage rear surface 117 of brake disc 80 when back face 124 engages torque face 102 and/or first arm 126 engages first surface 118. First clip 106 may be configured such that, when first clip 106 experiences movement relative to brake disc 80 in an axial direction of brake disc 80, first clip 106 (e.g., first arm 126) encounters disc first side 91 (e.g., first surface 118), and/or first clip 106 (e.g., second arm 128) encounters disc second side 93 (e.g., rear surface 117) to substantially cease continued movement in the axial direction. In examples, first arm 126 and/or second arm 128 are configured to accommodate the displacement D1, such that the displacement D1 causes brake disc 80 to help secure first clip 106 against movement in the outward radial direction R2 when first clip 106 is positioned on brake disc 80.

Back face 124, first arm interior wall 130, and/or second arm interior wall 132 may have any suitable orientation relative to the axis A of brake disc 80, inward radial direction R1, outward radial direction R2, first tangential direction T1, and/or second tangential direction T2. In some examples, back face 124 slants with respect to the inward radial direction R1, such that a vector parallel to back face 124 defines a slope $\Delta R1/\Delta T1$, where $\Delta R1$ is the absolute value of a displacement in the inward radial direction R1 and $\Delta T1$ is the absolute value of a displacement in a direction parallel to the first tangential direction T1. In some examples, first arm interior wall 130 and/or second arm interior wall 132 slant with respect to the inward radial direction R1, such that a vector parallel to back face 124 defines a slope $\Delta R1/\Delta A$, where $\Delta R1$ is the absolute value of a displacement in the inward radial direction R1 and $\Delta A$ is the absolute value of a displacement in a direction parallel to the axis A of brake disc 80.

Retainer 104 (e.g., first end section 110) is configured to be slidable over first clip 106 when first clip 106 is positioned over first surface 118, to help secure first clip 106 to brake disc 80. In examples, retainer 104 is configured to be urged over first clip 106 in the inward radial direction R1. Retainer 104 may be configured to receive some portion of first clip 106 within channel 119 when retainer 104 slides over first clip 106. In examples, retainer 104 is configured to provide an inward clamping force against first clip 106 when retainer 104 is positioned and/or radially urged over clip 106. Retainer 104 may be configured to provide the inward clamping force to cause first arm interior wall 130 to engage first surface 118 and/or cause second arm interior wall 132 to engage rear surface 117 when first clip 106 is positioned on brake disc 80.

Retainer 104 may include a first leg 134 and a second leg 136 extending from a bridge section 138. In the example shown in FIG. 7, first leg 134 and second leg 136 define channel 119. Bridge section 138 may be configured to resiliently bias first leg 134 toward second leg 136, and/or resiliently bias second leg 136 toward first leg 134, such that retainer 104 provides the inward clamping force when retainer 104 receives first clip 106 in channel 119. The resilient biasing provided by bridge section 138 may result in, for example, a tendency of first leg 134 and second leg 136 to return or attempt to return to an initial spacing when first leg 134 and/or second leg 136 is displaced from a resting, substantially zero-stress position. This resilient biasing may enable retainer 104 to be urged over clip 106 such that first leg 134 and second leg 136 provide contact pressure to clip 106 to assist with securing drive insert assembly 100 relative to brake disc 80 in the radial, tangential, and/or axial directions of brake disc 80.

Retainer 104 may engage clip 106 in any suitable manner when retainer 104 is positioned on clip 106. In some examples, portions of first leg 134 and second leg 136 are configured to insert into slots defined by first arm 126 and second arm 128 of clip 106. For example, first arm 126 may define a first slot 140 configured to receive a portion of retainer 104 (e.g., first leg 134) when retainer 104 is positioned on first clip 106. Second arm 128 may define a second slot 142 configured to receive a portion of retainer 104 (e.g., second leg 136) when retainer 104 is positioned on first clip 106. Second slot 142 may be configured similarly to first slot 140. Retainer 104 and first clip 106 may be configured to establish a snap-fit, interference fit, a press fit, or other fit when retainer 104 positions over first clip 106, and may be welded, soldered, and/or attached using a fastener which penetrates retainer 104 and/or clip 106.

As discussed, and as depicted in FIG. 5, retainer 104 may be configured to engage first clip 106 and second clip 108 when first clip 106 and second clip 108 are positioned on brake disc 80. Retainer 104 may be configured to engage second clip 108 in manners similar to those described for first clip 106. For example, retainer 104 may include second end section 112 configured to engage second clip 108 in manners similar to those described for first end section 110 and first clip 106. Medial section 114 may substantially extend from first end section 110 to second end section 112. In examples, medial section 114 is configured to substantially conform to a portion of brake disc 80 (e.g., disc outer perimeter 84) when retainer 104 engages first clip 106 and second clip 108.

Drive insert assembly 100 may be configured to limit or eliminate slots, apertures, channels, grooves, and other structural features in brake disc 80 that may contribute to wear and/or fatigue of a brake disc over repeated braking operations. For example, some drive inserts may require slots, apertures, channels, grooves, and other structural features to substantially mate with a flange, a peg, a hole, or other structures defined by the drive insert in order to limit relative movements in a radial, tangential, or axial direction of a brake disc. These structural features may wear and/or fatigue over repeated operations of brake system, reducing the positional security of the drive insert on the brake disc, degrading the surface integrity of the brake disc, concentrating stress in the brake disc, and causing other undesirable effects. Drive insert assembly 100 may be configured to position on brake disc 80 in a manner reducing and/or eliminating the need for such lots, apertures, channels, grooves, and other structural features on brake disc 80, in order to limit such undesirable impacts on the integrity of brake disc 80.

FIGS. 8A-8C illustrate front, side, and top plan views, respectively, of an example first clip 106. FIGS. 8A-8C are discussed with reference to first clip 106 and its interactions with first end section 110 and medial section 114 of retainer 104, first drive slot 86, and brake disc 80. Second clip 108 may be configured similarly to first clip 106 and interact in similar manners with second end section 112 and medial section 114 of retainer 104, second drive slot 88, and brake disc 80. Thus, the description of first clip 106 also applies to second clip 108.

The inward radial direction R1, outward radial direction R2, first tangential direction T1, second tangential direction T2, and axial direction A1 maintain the same orientation with respect to first clip 106 in each of FIGS. 8A, 8B, and 8C. In FIG. 8A, the first tangential direction T1 proceeds into the page and the second tangential direction T2 proceeds out of the page. In FIG. 8B, the axial direction A1 proceeds out of the page. In FIG. 8C, the inward radial direction R1 proceeds into the page and the outward radial direction R2 proceeds out of the page. First clip 106 includes body section 120 defining drive face 122, first arm 126 and second arm 128 extending from body section 120, and back face 124 opposite drive face 122.

First arm 126 includes a first arm interior wall 130 and a first arm exterior wall 144, with first arm interior wall 130 and first arm exterior wall 144 on substantially opposite sides of first arm 126. Second arm 128 includes a second arm interior wall 132 and a second arm exterior wall 146, with second arm interior wall 132 and second arm exterior wall 146 on substantially opposite sides of second arm 128. First arm interior wall 130 and second arm interior wall 132 may generally face each other, while first arm exterior wall 144 and second arm exterior wall 146 may generally face away from each other. First clip 106 defines gap G between first arm interior wall 130 and second arm interior wall 132. Gap G is configured to receive a part of brake disc 80, e.g., mate with a part of brake disc 80 (e.g., portion 80A (FIGS. 5 and 6)) adjacent to drive slot 86 (FIGS. 3-6).

Gap G may be defined by a displacement D2 between first arm interior wall 130 and second arm interior wall 132. The displacement D2 may be substantially parallel to the axial direction A1 and may vary with respect to the inward radial direction R1. For example, the displacement D2 may decrease in the inward radial direction R1 and increase in the outward radial direction R2, such that first arm interior wall 130 and second arm interior wall 132 generally slant away from each other. In some examples, displacement D2 may increase and/or remain substantially constant in the inward radial direction R1 and/or outward radial direction R2.

In some examples, first clip 106 is configured such that the displacement D2 between first arm interior wall 130 and second arm interior wall 132 varies in the same manner as displacement D1 (FIG. 6) between first surface 118 and rear surface 117 of brake disc 80, which can help facilitate the achievement of a desirable level of physical engagement between clip 106 and brake disc 80. For example, the displacement D1 may decrease in the inward radial direction R1 and the displacement D2 may decrease in the inward radial direction R1. First clip 106 may be configured such that the varying displacement D2 between first arm interior wall 130 and second arm interior wall 132 dovetails with the varying displacement D1 of brake disc 80. The displacement D2 may decrease in the inward radial direction R1 such that, when first clip 106 is positioned over first surface 118, the decreasing displacement D2 between first arm 126 and second arm 128 substantially secures first clip 106 against movement in the outward radial direction R2. Further, when first clip 106 is positioned over first surface 118, ledge 121 and/or ledge 123 (FIG. 6) may substantially secure first clip 106 against movement in a radial direction of brake disc 80 (e.g., in the inward radial direction R1).

First clip 106 is may be configured such that, when first clip 106 receives a portion of brake disc 80 (e.g., portion 80A (FIGS. 5 and 6)), brake disc 80 may help secure first clip 106 against movement in an axial direction (e.g., axial direction A1 and/or a direction opposite axial direction A1). In examples, first clip 106 is configured such that, when first clip 106 receives the portion of brake disc 80, first arm interior wall 130 substantially faces first surface 118 and/or second arm interior wall 132 substantially faces rear surface 117, such that first surface 118 and/or rear surface 117 limit movement if first clip 106 in the axial direction. First arm interior wall 130 may contact first surface 118 and/or second arm interior wall 132 may contact rear surface 117 when clip 106 is positioned on brake disc 80. For example, first clip 106 may be configured such that when back face 124 engages torque face 102 of brake disc 80, first arm interior wall 130 is positioned over first surface 118 and second arm interior wall 132 is positioned over rear surface 117.

First clip 106 can be positioned over brake disc 80 using any suitable technique. For example, first clip 106 may be configured such that, to position clip 106 over first surface 118, first arm interior wall 130 is slid over first surface 118 and second arm interior wall 132 is slid over rear surface 117, e.g., in the tangential direction T1. First clip 106 may be configured such that, when first arm 126 is slid over first surface 118 and second arm 128 is slid over rear surface 117, brake disc 80 substantially secures first clip 106 against movement in a radial direction of brake disc 80 (e.g., in the outward radial direction R2). First clip 106 may be configured such that when back face 124 engages torque face 102 of brake disc 80, the displacement D1 of brake disc 80 decreases in the inward radial direction R1.

Hence, first clip 106 may be configured to limit relative movement between first clip 106 and brake disc 80 in a radial direction of brake disc 80 (e.g., the inward radial direction R1 and/or outward radial direction R2) when first clip 106 is positioned on brake disc 80. First clip 106 may be configured to limit relative movement between first clip 106 and brake disc 80 in an axial direction of brake disc 80 (e.g., the axial direction A1 or a direction opposite axial direction A1) when first clip 106 is positioned on brake disc 80. First clip 106 may be configured to limit relative movement between first clip 106 and brake disc 80 in a tangential direction of brake disc 80 (e.g., the first tangential direction T1) when first clip 106 is positioned on brake disc 80. The support provided by clip 106 against axial, radial, and tangential movements when positioned on brake disc 80 may be present in the absence of an additional attachment mechanism such as rivet. Thus, clip 106 may provide support to limit axial, radial, and tangential movements when installed on brake disc 80 without the necessity of an extra attachment device (e.g., a rivet) penetrating first clip 106 and/or brake disc 80.

First clip 106 can have any suitable configuration. In some examples, body section 120 and arms 126, 128 are formed to be physically separate from each other and subsequently attached to define clip 106. In other examples, body section 120 and arms 126, 128 have a unitary body construction, e.g., are formed to be one piece. First clip 106 may be formed by machining out of bar stock, investment casting, 3D printing, or some other suitable method. Further, in some examples, first clip 106 can be formed from any suitable materials, such as, but not limited to, an austenitic nickel-chromium-based superalloys (e.g., Inconel available from Special Metals Corporation of New Hartford, N.Y.) or other alloys. In some examples, body section 120 and arms 126, 128 are formed from the same material, while in other examples, at least two of body section 120, first arm 126, and second arm 128 are formed from different materials from each other.

First clip 106 may be configured to limit motion of retainer 104 in the outward radial direction R2. For example, first arm 126 may be configured to limit movement of retainer 104 in the outward radial direction R2 when first slot 140 receives a portion of retainer 104 (e.g., first leg 134). First slot 140 may be configured to form a snap-fit with retainer 104 (e.g., first leg 134). In examples, first arm 126 defines a first retaining surface 141 configured to limit movement of retainer 104 in the outward radial direction R2 when first slot 140 receives the portion of retainer 104. Second arm 128 may define a second retaining surface 143 configured to limit movement of retainer 104 in the outward radial direction R2 when second slot 142 receives a portion of retainer 104 (e.g., second leg 136). First retaining surface 141 and/or second retaining surface 143 may be configured to encounter retainer 104 when retainer 104 experiences a force in the outward radial direction R2, such that first retaining surface 141 and/or second retaining surface 143 limit motion of retainer 104 in the outward radial direction R2.

First clip 106 may be configured to limit motion of retainer 104 in a tangential direction of brake disc 80 (e.g., the first tangential direction T1) For example, first arm 126 may be configured to limit movement of retainer 104 in the first tangential direction T1 when first slot 140 receives a portion of retainer 104 (e.g., first leg 134). For example, first arm 126 may define a first holding surface 145 configured to limit movement of retainer 104 in a tangential direction (e.g., the first tangential direction T1) when first slot 140 receives the portion of retainer 104. Second arm 128 may define a second holding surface 147 configured to limit movement of retainer 104 in a tangential direction (e.g., the first tangential direction T1) when second slot 142 receives a portion of retainer 104 (e.g., second leg 136). First holding surface 145 and/or second holding surface 147 may be configured to encounter retainer 104 when retainer 104 experiences a force in the first tangential direction T1, such that first holding surface 145 and/or second holding surface 147 limit motion of retainer 104 in the first tangential direction T1.

Second clip 108 (FIGS. 4 and 5) of drive insert assembly 100 may include a body section, a drive face, a back face, a first arm, a second arm, a gap, a first arm interior wall, a second arm interior wall, a first slot, a first retaining surface, a first holding surface, a second slot, a second retaining surface, a second holding surface, a first arm exterior wall, and a second arm exterior wall, which may be configured individually and relative to each other in the same manner as body section 120, drive face 122, back face 124, first arm 126, second arm 128, gap G, first arm interior wall 130, second arm interior wall 132, first slot 140, first retaining surface 141, first holding surface 145, second slot 142, second retaining surface 143, second holding surface 147, first arm exterior wall 144, and second arm exterior wall 146 of first clip 106. As discussed, first clip 106 may be configured to position on brake disc 80 and a first drive slot (e.g., drive slot 86) by translating in the first tangential direction T1, and second clip 108 may be configured to position on brake disc 80 and a second drive slot (e.g., drive slot 88) by translating in the second tangential direction T2.

Figure 9B:
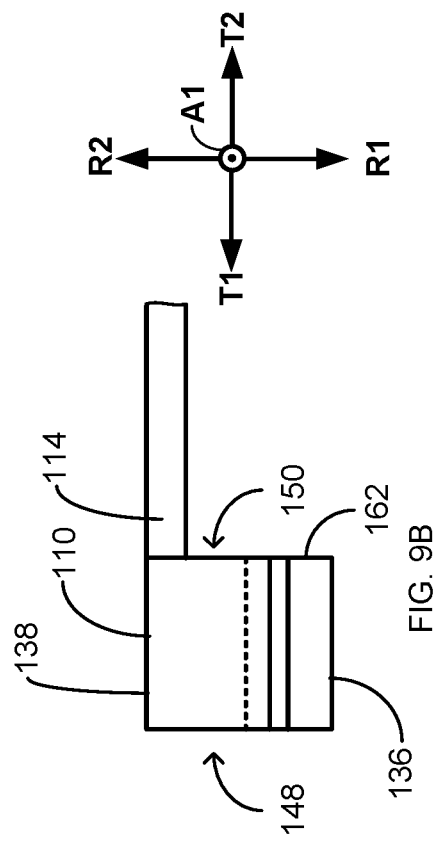
FIG. 9B is a side view of the retainer of FIG. 9A.
Figure 9C:
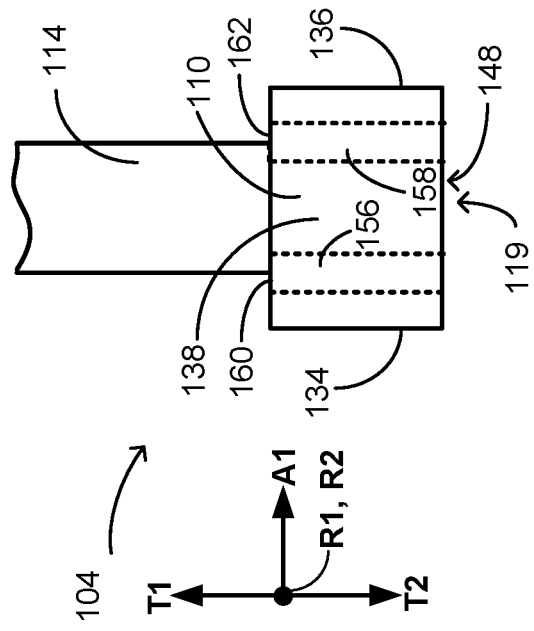
FIG. 9C is a top view of the retainer of FIG. 9A.
Figure 9A:
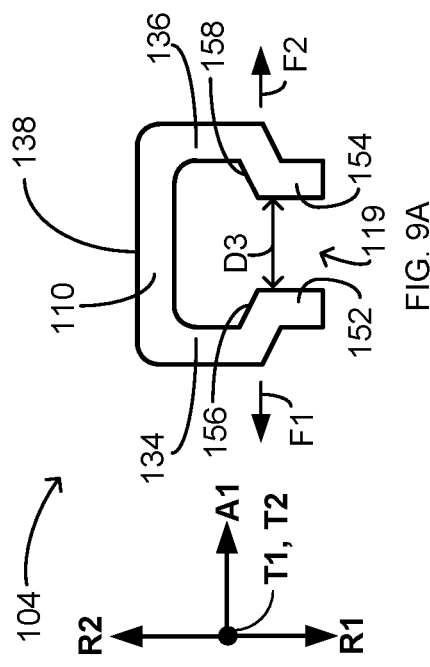
FIG. 9A is a front view of an example retainer of a drive insert.

FIGS. 9A-9C illustrate plan views of an example retainer 104. FIGS. 9A-9C are discussed with reference to first end section 110 and its interactions with first clip 106, medial section 114, and brake disc 80. Second end section 112 may be configured similarly to first end section 110 and interact in similar manners with second clip 108, medial section 114, and brake disc 80. Thus, the description of first end section 110 also applies to second end section 112.

FIG. 9A illustrates a front view, FIG. 9B illustrates a side view, and FIG. 9C illustrates a top view. The inward radial direction R1, outward radial direction R2, first tangential direction T1, second tangential direction T2, and axial direction A1 maintain the same orientation with respect to first clip 106 in each of FIGS. 9A, 9B, and 9C. In FIG. 9A, the first tangential direction T1 proceeds into the page and the second tangential direction T2 proceeds out of the page. In FIG. 9B, the axial direction A1 proceeds out of the page. In FIG. 9C, the inward radial direction R1 proceeds into the page and the outward radial direction R2 proceeds out of the page. Medial section 114 is illustrated as a partial section in FIGS. 9A-9C, however medial section 114 is configured to extend to a second end section (not shown). For examples, as illustrated in FIGS. 3 and 4, medial section 114 may extend from first end section 110 to second end section 112.

To provide further support to drive insert assembly 100, first end section 110 is slidable over first clip 106 when first clip 106 is positioned over first surface 118 (or another surface in other examples). First end section 110 may be slidable over first clip 106 in a radial direction of brake disc 80 (e.g., the inward radial direction R1). Reception of first clip 106 within channel 119 defined by first end section 110 may limit movement of retainer 104 in an axial direction of brake disc 80 (e.g., the axial direction A1). When positioned on first clip 106, first end section 110 may be configured such that retainer 104 limits movement of first clip 106 in the second tangential direction T2 of brake disc 80 as first clip 106 limits movement of retainer 104 in a first tangential direction T1 of brake disc 80. Further, first end section 110 and first clip 106 may be configured such that first clip 106 limits movement of retainer 104 in the outward radial direction R2 of brake disc 80 (e.g., when brake disc 80 limits movement of first clip 106 in the outward radial direction R2). Thus, when retainer 104 (e.g., first end section 110) is positioned on first clip 106, retainer 104 and first clip 106 may act to limit movement of drive insert assembly 100 against movements in the axial, radial, and tangential directions of brake disc 80. First clip 106 and retainer 104 may act together to secure drive insert assembly 100 to the brake disc without requiring a fastener (e.g., a rivet) or other element to penetrate drive insert assembly 100 and brake disc 80.

Retainer 104 may engage first clip 106 in any suitable manner when retainer 104 is positioned on first clip 106. For example, first end section 110 may be configured to receive a portion of clip 106 within channel 119 when first end section 110 is positioned over clip 106. In examples, first end section 110 is configured to contact at least some portion of first arm 126 and at least some portion of second arm 128 of clip 106 when channel 119 receives the portion of clip 106. In examples, first clip 106 defines a first open end 148 and a second open end 150, where first open end 148 and second open end 150 are in fluid communication through channel 119. Channel 119 may be at least partially defined by first leg 134 and second leg 136 extending from bridge section 138.

In examples, first end section 110 and first clip 106 are configured to substantially mate when retainer 104 positions over first clip 106. For example, first end section 110 and first clip 106 may be configured to establish a snap-fit, interference fit, a press fit, or other fit when retainer 104 positions over first clip 106. In some examples, first end section 110 and first clip may be welded, soldered, and/or attached using a fastener which penetrates retainer 104 and/or clip 106. However, such additional attachment mechanisms may not be necessary or used in all examples.

First end section 110 may be resiliently biased to provide an inward clamping action against first clip 106 when first end section 110 is positioned and/or radially urged over first clip 106. Bridge section 138 may be configured to resiliently bias first leg 134 and/or second leg 136, such that first end section 110 provides the inward clamping action. For example, first end section 110 may be configured such that, when first leg 134, second leg 136, and bridge section 138 are in a resting, substantially zero-stress position, first leg 134 and second leg 136 maintain a displacement D3. Bridge section 138 may be configured to provide resilient biasing to first leg 134 which generates a tendency of first leg 134 to return or attempt to return to a position establishing the displacement D3 when the first leg 134 is temporarily displaced by a force F1 acting on first leg 134 in the direction shown at FIG. 9A. In addition or instead, in some examples, bridge section 138 is configured to provide resilient biasing to second leg 136 which generates a tendency of second leg 136 to return or attempt to return to a position establishing the displacement D3 when the second leg 136 is temporarily displaced by a force F2 acting on second leg 136 in the direction shown at FIG. 9A. The resilient biasing may provide a gripping force and/or inward clamping force onto first clip 106 when first end section 110 slides over first clip 106 and contacts some portion of first arm 126 and some portion of second arm 128.

As discussed above, in some examples, first end section 110 and first clip 106 can include mating features that help engage retainer 104 and first clip 106 and fix a relative position of retainer 104 and first clip 106. In some examples, first end section 110 may comprise a first tab 152 and a second tab 154 configured to engage with respective slots 140, 142 (FIG. 8A) of first clip 106. First tab 152 can be defined by or coupled to first leg 134 and second tab 154 can be defined by or coupled to second leg 136. First leg 134 may be configured to bias first tab 152 and second leg 136 may be configured to bias second tab 154 to maintain the displacement D3 between first tab 152 and second tab 154. First tab 152 may be configured to insert into first slot 140 when first end section 110 is positioned over first clip 106, and second tab 154 may be configured to insert into second slot 142 when first end section 110 is positioned over first clip 106.

First tab 152 and/or second tab 154 may be configured to insert into respective slots 140, 142 with any suitable type of fit, such as, but not limited to, a snap fit, an interference fit, a press fit, or other fit, and may be welded, soldered, and/or attached using a fastener which penetrates retainer 104 and/or first clip 106. The interlocking snap-fit may assist in trapping first clip 106 and retainer 104 against movements in the axial, radial, and tangential directions of brake disc 80 when drive insert assembly 100 is installed on brake disc 80.

Displacement D3 is the displacement between first tab 152 and second tab 154 when first end section 110 is in a resting state. In some examples, displacement D3 is less than a displacement between first tab 152 and second tab 154 when first end section 110 is positioned over first clip 106, such that the resilient biasing of first leg 134 and/or second leg 136 generates an inward clamping force on first clip 106 when first end section 110 is positioned over first clip 106. The inward clamping force may cause first tab 152 to press on some portion of first slot 140 in a direction opposite the force F1 and/or cause second tab 154 to press on some portion of second slot 142 in a direction opposite the force F2.

First end section 110 may be configured to engage first clip 106 when first end section 110 receives first clip 106 (e.g., in channel 119) such that first clip 106 limits movement of retainer 104 in the outward radial direction R2. First end section 110 may be configured such that first clip 106 limits movement of retainer 104 in the outward radial direction R2 when first leg 134 inserts into first slot 140 and/or second leg 136 inserts into second slot 142. In examples, first end section 110 defines a first bearing surface 156 having an orientation which opposes first retaining surface 141 (FIG. 8A) of first slot 140, such that when first end section 110 is positioned over first clip 106 and first clip 106 is positioned over first surface 118 and/or rear surface 117 of brake disc 80, first end section 110 is resistant to forces seeking to translate retainer 104 in a radial direction of brake disc 80 (e.g., in the outward radial direction R2). First bearing surface 156 may define a non-zero displacement in a direction substantially parallel to the axial direction A1 and may define a non-zero displacement in a direction substantially parallel to the first tangential direction T1. The non-zero displacement(s) of first bearing surface 156 may cause first end section 110 to contact first clip 106 when retainer 104 experiences a force in the outward radial direction R2.

In examples, first end section 110 defines a second bearing surface 158 having an orientation which opposes second retaining surface 143 (FIG. 8A) of second slot 142, such that when first end section 110 is positioned over first clip 106 and first clip 106 is positioned over first surface 118 and/or rear surface 117 of brake disc 80, first end section 110 is resistant to forces seeking to translate retainer 104 in a radial direction of brake disc 80 (e.g., in the outward radial direction R2). Second bearing surface 158 may define a non-zero displacement in a direction substantially parallel to the axial direction A1 and may define a non-zero displacement in a direction substantially parallel to the first tangential direction T1. The non-zero displacement(s) of second bearing surface 158 may cause first end section 110 to contact first clip 106 when retainer 104 experiences a force in the outward radial direction R2.

Hence, retainer 104 may be configured such that first clip 106 limits movement of retainer 104 in a radial direction (e.g., the outward radial direction R2) when retainer 104 is positioned on first clip 106. Retainer 104 may be configured such that a force on retainer 104 in the outward radial direction R2 causes retainer 104 to exert a force on first clip 106 in the outward radial direction R2 (e.g., via engagement of first bearing surface 156 and first retaining surface 141 (FIG. 8A) and/or second bearing surface 158 and second retaining surface 143 (FIG. 8A)). Disc 80 may limit movement of first clip 106 in the outward radial direction R2 (e.g., by engagement of first arm interior wall 130 and first surface 118 (FIG. 6) and/or second arm interior wall 132 and rear surface 117 (FIG. 6), such that first clip 106 exerts a reaction force on retainer 104 to limit movement of retainer 104 in the outward radial direction R2.

Retainer 104 may be configured to engage first clip 106 when retainer 104 receives first clip 106 (e.g., in channel 119) such that retainer 104 limits movement of first clip 106 in the second tangential direction T2. For example, first end section 110 may be configured to limit movement of first clip 106 in the second tangential direction T2 when first leg 134 inserts into first slot 140 of first clip 106 and/or second leg 136 inserts into second slot 142 of first clip 106.

In examples, first leg 134 (e.g., first tab 152) defines a first back surface 160 configured to engage first holding surface 145 of first clip 106 (FIG. 8A-8C). First back surface 160 may extend in a direction substantially parallel (e.g., parallel or nearly parallel to the extent permitted by manufacturing tolerances) to the axial direction A1, such that first back surface 160 engages first holding surface 145 when first clip 106 moves or attempts to move in the second tangential direction T2. In a similar manner, second tab 154 may define a second back surface 162 configured to engage second holding surface 147 of first clip 106 (FIG. 8A-8C). Second back surface 162 may extend in a direction substantially parallel to the axial direction A1, such that second back surface 162 engages second holding surface 147 when first clip 106 moves or attempts to move in the second tangential direction T2.

Further, when first clip 106 is positioned on brake disc 80 such that brake disc 80 limits further motion of first clip 106 in the first tangential direction T1, first clip 106 may limit movement of retainer 104 in the first tangential direction T1. For example, first end section 110 may be configured such that when retainer 104 moves or attempts to move in the first tangential direction T1, first back surface 160 of first end section 110 engages first holding surface 145 of first clip 106 to cause first clip 106 to exert a reaction force on first end section 110, limiting the movement of retainer 104. First end section 110 may be configured such that second back surface 160 engages second holding surface 147 to cause first clip 106 to exert the reaction force.

Thus, retainer 104 may be configured to limit movement of first clip 106 in the second tangential direction T2. First clip 106 may be configured to limit movement of retainer 104 in the first tangential direction T1. In examples, retainer 104 and first clip 106 are configured such that retainer 104 limits movement of first clip 106 in the second tangential direction T2 as first clip 106 limits movement of retainer 104 in the first tangential direction T1.

As discussed, and as illustrated at FIGS. 4 and 5, medial section 114 extends from first end section 110 to second end section 112. Medial section 114 may be configured to transmit a force from first end section 110 to second end section 112, and from second end section 112 to first end section 110. Thus, medial section 114 may be configured such that first clip 106 acts to limits movement of second clip 108 in the first tangential direction T1, and second clip 108 acts to limit movement of first clip 106 in the second tangential direction T2. For example, and referring mainly to FIG. 5, when second clip 108 experiences a force in the first tangential direction T1 (e.g., opposite second tangential direction T2), a holding surface 164 (FIGS. 4, 5) of second clip 108 may exert a force in the first tangential direction T1 against a back surface 166 (FIGS. 4, 5) of retainer 104. Second end section 112 may define back surface 166. Medial section 114 may be configured such that the force exerted on back surface 166 transmits through medial section to first end section 110, causing first back surface 160 to exert a force in the first tangential direction T1 on first holding surface 145 of first clip 106. The force on first holding surface 145 may correspondingly cause first clip 106 to exert a force in the first tangential direction T1 against brake disc 80 (e.g., on step 125 (FIG. 6)), causing brake disc 80 to exert a reaction force against first clip 106 to limit movement of first clip 106. First holding surface 145 may subsequently exert a reaction force against first back surface 160 of first end section 110, causing medial section 114 to transmit the reaction force to second end section 112, and such that back surface 166 exerts a reaction force on holding surface 164 to limit movement of second clip 108. When first clip 106 experiences a force in the second tangential direction T2, medial section 114 may act in a similar manner, such that a reaction force of brake disc 80 against second clip 108 limits movement of first clip 106. Thus, medial section 114 may be configured such that first clip 106 acts to limits movement of second clip 108 in the first tangential direction T1, and second clip 108 acts to limit movement of first clip 106 in the second tangential direction T2.

Second end section 112 (FIGS. 4 and 5) of retainer 104 may include a channel, a first leg, a second leg, a bridge section, a first open end, a second open end, a first bearing surface, a second bearing surface, a first back surface, and a second back surface (e.g., back surface 166), which may be configured individually and relative to each other in the same manner as channel 119, first leg 134, second leg 136, bridge section 138, first open end 148, second open end 150, first bearing surface 156, second bearing surface 158, first back surface 160, and second back surface 162 of first end section 110. As discussed, first end section 110 may be configured to position over first clip 106, and second end section 112 may be configured to position over second clip 108.

Drive insert assembly 100 described herein, as well as wheel 10 and brake system 40, and the components thereof, may be made from any suitable material. For example, the material may be any material of suitable strength for the intended use of drive insert assembly 100, wheel 10, brake system 40, and the components thereof. In some examples, the material includes a metal or a metal alloy. For example, the material may include a nickel alloy or steel alloy. As one example, the material may include stainless steel.

Drive insert assembly 100, wheel 10, brake system 40, and the components thereof can be formed using any suitable technique. Drive insert assembly 100, wheel 10, brake system 40, and the components thereof may be forged, casted, made from bar stock, additive manufactured (e.g., three-dimensionally (3D) printed), extruded, drawn, or be produced using other suitable methods. In some examples, drive insert assembly 100, wheel 10, brake system 40, and the components thereof may be machined to define the configurations described herein. In other examples, drive insert assembly 100, wheel 10, brake system 40, and the components thereof may be formed without having to be substantially machined.

Drive insert assembly 100, wheel 10, brake system 40, and the components thereof, may be formed to have any shape. In some examples, two or more components of drive insert assembly 100, wheel 10, and brake system 40 are formed to be physically separate from each other and subsequently joined and/or attached to define drive insert assembly 100, wheel 10, and brake system 40. In other examples, two or more components of drive insert assembly 100, wheel 10, and brake system 40 have a unitary body construction, e.g., are formed to be one piece. In some examples, first end section 110, second end section 112, and/or medial section 114 are formed to be physically separate from each other and subsequently joined and/or attached to define drive insert assembly 100. In other examples, first end section 110, second end section 112, and/or medial section 114 have a unitary body construction, e.g., are formed to be one piece.

First clip 106 may be formed using any suitable technique. Second clip 108 may be formed in manners similar to first clip 106. In examples, body section 120, first arm 126, and/or second arm 128 are configured to join and/or attach to form first clip 106. In examples, body section 120, first arm 126, and/or second arm 128 have a unitary body construction, e.g., are formed to be one piece. Surfaces and/or portions of first clip 106, such as drive face 122, back face 124, first arm interior wall 130, first arm exterior wall 144, second arm interior wall 132, second arm exterior wall 146, first retaining surface 141, second retaining surface 143, and other surfaces and/or portions may be formed through machining, forging, casting, machining, additive manufacturing, extrusion, drawing, or other suitable methods.

First end section 110 may be formed using any suitable technique. Second end section 112 may be formed in manners similar to first end section 110. In examples, bridge section 138, first leg 134, and/or second leg 136 are configured to join and/or attach to form first end section 110. In examples, bridge section 138, first leg 134, and/or second leg 136 have a unitary body construction, e.g., are formed to be one piece. Surfaces and/or portions of first end section 110, such as first leg 134, second leg 136, first tab 152, second tab 154, channel 119, first bearing surface 156, second bearing surface 158, first back surface 160, second back surface 162, and other surfaces and/or portions may be formed through machining, forging, casting, machining, additive manufacturing, extrusion, drawing, or other suitable methods.

In some examples, wheel 10 may be finish machined from a near-net-shaped aluminum forging and contain an axial assembly and/or wheel rim for assembly of brake system 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including brake disc 80, rotor discs 60, 61, 62, 63 and stator discs 64, 65, 66, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure. Surfaces and/or portions of brake disc 80, such as central aperture 82, disc outer perimeter 84, drive slots 86, 88, friction surface 90, disc first side 91, disc second side 93, first surface 118, rear surface 117, and other surfaces and/or portions, may be formed using any suitable manner, such as machining.

Figure 10:
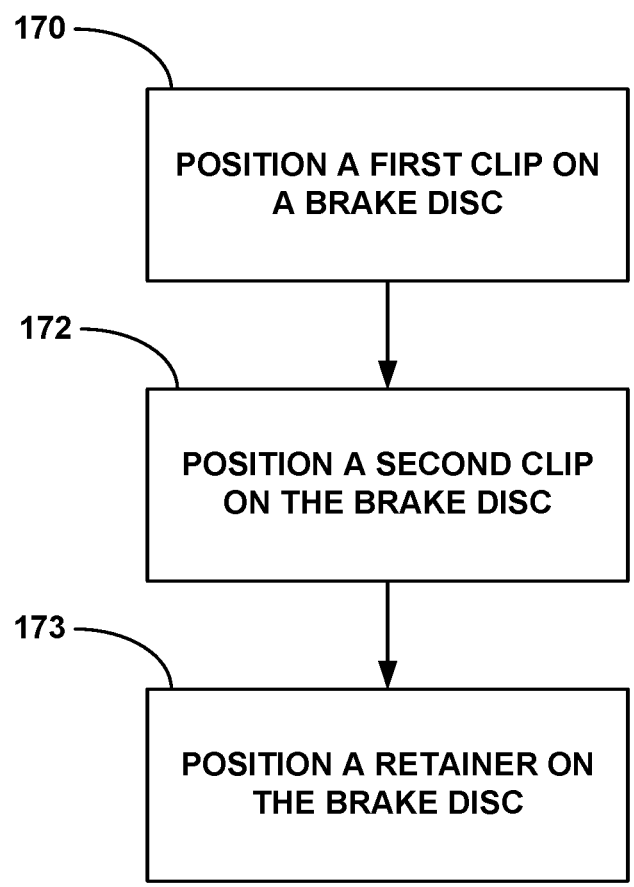
FIG. 10 is a flow diagram illustrating an example technique of installing a drive insert including a first clip, a second clip, and a retainer.

FIG. 10 illustrates a flow diagram of an example technique for positioning a drive insert on a drive slot of a brake disc. Although the technique is described with reference to drive insert assembly 100 and brake disc 80 of FIGS. 3-9C, in other examples, the technique may be used with another drive insert and brake disc.

The technique includes positioning first clip 106 on brake disc 80 by sliding first clip 106 in a first tangential direction T1 of brake disc 80 (170). First clip 106 may be positioned to cover portions of first surface 118 and rear surface 117 of brake disc 80, which may be on opposite sides of brake disc 80 and adjacent to a first drive slot 86.

First clip 106 may include body section 120 with first arm 126 and second arm 128 extending from body section 120. In some examples, first clip 106 is slid tangentially onto brake disc 80 so that first arm 126 covers some portion of first surface 118 and second arm 128 covers some portion of rear surface 117. In some examples, a first arm interior wall 130 of first arm 126 and a second arm interior wall 132 of second arm 128 may slant away from each other, and may be oriented with respect to brake disc 80 such that first clip 106 establishes a dovetail fit with brake disc 80 when first clip 106 is slid tangentially onto brake disc 80. Body section 120 may comprise back face 124, and clip 106 may be slid tangentially onto brake disc 80 so that back face 124 engages and/or contacts a torque face 102 of brake disc 80.

The technique includes positioning second clip 108 on brake disc 80 by sliding second clip 108 in a second tangential direction T2 of brake disc 80 (172). The second tangential direction T2 may be substantially opposite the first tangential direction T1 relative to brake disc 80. Second clip 108 may be positioned on brake disc 80 by sliding in the second tangential direction T2 and relative to a second drive slot 88 in the same manner as first clip 106 positions on brake disc 80 by sliding in the first tangential direction T1 and relative to the first drive slot such as drive slot 86.

Second clip 108 may include a first arm and a second arm extending from a body section and similar to first arm 126, second arm 128, and body section 120 of first clip 106. In some examples, second clip 108 is slid tangentially onto brake disc 80 so that the first arm of second clip 108 covers some portion of the surface on disc first side 91 and the second arm of second clip 108 covers some portion of the surface on disc second side 93. In some examples, a first arm interior wall of second clip 108 and a second arm interior wall of second clip 108 may slant away from each other, and may be oriented with respect to brake disc 80 such that second clip 108 establishes a dovetail fit with brake disc 80 when second clip 108 is slid tangentially onto brake disc 80. The body section of second clip 108 may comprise a back face, and second clip 108 may be slid tangentially onto brake disc 80 so that the back face of second clip 108 engages and/or contacts a torque face of brake disc 80 (e.g., a torque face of drive slot 88).

The technique further includes positioning retainer 104 on brake disc 80 (174). For example, retainer 104 can be positioned on brake disc 80 in an inward radial direction R1 of brake disc 80. For example, after first clip 106 and/or second clip 108 are placed on brake disc 80, retainer 104 can be urged over first clip 106 and/or second clip 108 in the inward radial direction R1 of brake disc 80. In examples, a first end section 110 of retainer 104 is urged over first clip 106 and a second end section 112 of retainer 104 is urged over second clip 108. A medial section 114 between first end section 110 and second end section 112 may substantially conform to disc outer perimeter 84 of brake disc 80 when retainer 104 is positioned on brake disc 80.

In examples, retainer 104 defines a channel 119 configured to receive first clip 106 when retainer 104 is positioned over first clip 106 in the inward radial direction R1. Retainer 104 (e.g., first end section 110) may comprise a first leg 134 and a second leg 136 which contact first clip 106 when retainer 104 is positioned over first clip 106 in the inward radial direction R1. First leg 134 and second leg 136 may be resiliently biased toward one another by bridge section 138, so that first leg 134 and second leg 136 provide an inward clamping force on clip 106 when retainer 104 is positioned over clip 106 in the radial direction.

In some examples, retainer 104 (e.g., first end section 110) and first clip 106 include structures that are configured to interlock or otherwise mate together to help fix a position of retainer 104 relative to first clip 106. For example, first leg 134 of retainer 104 may define first tab 152 configured to be inserted into a first slot 140 defined by first arm 126 of first clip 106 when retainer 104 is positioned over first clip 106 in the radial direction. Second leg 136 of retainer 104 may define a second tab 154 configured to be inserted into a second slot 142 defined by second arm 128 of first clip 106 when retainer 104 is positioned over first clip 106 in the radial direction. First tab 152 may insert into first slot 140 such that a first bearing surface 156 of first tab 152 and a first retaining surface 141 of first slot 140 oppose one another to limit movement of retainer 104 in a radial direction of brake disc 80. Second tab 154 may insert into second slot 142 such that a second bearing surface 158 of second tab 154 and a second retaining surface 143 of second slot 142 oppose one another to limit movement of retainer 104 in a radial direction of brake disc 80.

In examples, first tab 152 inserts into first slot 140 such that a first back surface 160 of first tab 152 and a first holding surface 145 of first slot 140 oppose one another to limit movement of retainer 104 in a tangential direction of brake disc 80. Second tab 154 may insert into second slot 142 such that a second back surface 162 of second tab 154 and a second holding surface 147 of second slot 142 oppose one another to limit movement of retainer 104 in a tangential direction of brake disc 80. Positioning retainer 104 over the positioned first clip 106 in a radial direction of brake disc 80 may include positioning retainer 104 in a radial direction of brake disc 80 until first tab 152 inserts into first slot 140 and second tab 154 inserts into second slot 142.

Second end section 112 of retainer 104 may define a channel, a first leg, a second leg, a bridge section, a first tab, a second tab, a first bearing surface, a second bearing surface, a first back surface, and a second back surface, which may be configured individually and in relation to each other in substantially the same manner as channel 119, first leg 134, second leg 136, bridge section 138, first tab 152, second tab 154, first bearing surface 156, second bearing surface 158, first back surface 160, and second back surface 162 of first end section 110. Second clip 108 may include a first slot, a second slot, a first retaining surface, a second retaining surface, a first holding surface, and a second holding surface, which may be configured individually and in relation to each other in substantially the same manner as first slot 140, second slot 142, first retaining surface 141, second retaining surface 143, first holding surface 145, and second holding surface 147 of first clip 106. Structures of second end section 112 and second clip 108 may be configured to interlock or otherwise mate together to help fix a position of retainer 104 relative to second clip 108 when second end section 112 positions over second clip 108. Second end section 112 may position over second clip 108 in substantially the same manner as first end section 110 positions over first clip 106.

The technique of FIG. 10 may be performed manually by a user or with the aid or automatically by machinery.

The present disclosure includes the following examples.

Example 1: An assembly comprising: a first clip configured to be slidable over a first surface of a brake disc in a first tangential direction of the brake disc, the first surface being adjacent to a first drive slot on a perimeter of the brake disc; a second clip configured to be slidable over a second surface of the brake disc in a second tangential direction opposite the first tangential direction, the second surface being adjacent to a second drive slot on the perimeter of the brake disc; and a retainer configured to be slidable over the first clip and the second clip when the first clip is positioned over the first surface and the second clip is positioned over the second surface to secure the first and second clips to the brake disc.

Example 2: The assembly of example 1, wherein at least one of the first clip or the second clip comprises a body section, the body section comprising: a drive face; and a back face opposite the drive face, wherein the back face is configured to engage a torque face of the brake disc when the first clip is positioned over the first surface, and wherein the torque face defines a portion of the first drive slot of the brake disc.

Example 3: The assembly of example 2, wherein the at least one of the first clip or the second clip further comprises: a first arm extending from the body section; and a second arm extending from the body section.

Example 4: The assembly of example 3, wherein the retainer is configured to contact the first arm and the second arm when the retainer is positioned over the first clip and over the second clip.

Example 5: The assembly of example 3 or 4, wherein the first arm and the second arm define a gap configured to receive a portion of the brake disc when the back face engages the torque face.

Example 6: The assembly of any of examples 3-5, wherein the first arm and the second arm slant away from each other when the back face engages the torque face.

Example 7: The assembly of any of examples 1-6, wherein the retainer defines a channel having a first open end and a second open end opposite the first open end, wherein the channel is configured to surround a portion of an individual clip when the retainer is positioned over the individual clip, wherein the individual clip is one of the first clip or the second clip.

Example 8: The assembly of any of examples 1-7, wherein the retainer comprises a first tab and a second tab, wherein the first tab is configured to be received in a first slot of an individual clip and the second tab is configured to be received in a second slot of the individual clip when the retainer is positioned over the individual clip, wherein the individual clip is one of the first clip or the second clip.

Example 9: The assembly of example 10, wherein the retainer is resiliently biased to generate an inward clamping force between the first tab and the second tab when the first tab is received in the first slot and the second tab is received in the second slot.

Example 10: The assembly of any of examples 1-9, wherein the retainer is configured to extend from the first clip to the second clip when the retainer is positioned over the first clip and the second clip.

Example 11: The assembly of any of examples 1-10, wherein the retainer is configured to conform to a portion of a perimeter of the brake disc when the retainer is positioned over the first clip and the second clip.

Example 12: The assembly of any of examples 1-11, wherein the first clip is configured to frictionally engage the first surface in a rivetless configuration when the retainer is positioned over the first clip, and wherein the second clip is configured to frictionally engage the second surface in a rivetless configuration when the retainer is positioned over the second clip.

Example 13: The assembly of any of examples 1-12, wherein the retainer configured to be slidable over the first clip and the second clip in a radial direction of the brake disc when the first clip is positioned over the first surface and the second clip is positioned over the second surface.

Example 14: An assembly comprising: a brake disc defining: a first drive slot extending at least partially through a perimeter of the brake disc in an axial direction of the brake disc, wherein a first torque face defines a portion of the first drive slot; a first surface adjacent to the first drive slot; a second drive slot extending at least partially through the perimeter of the brake disc in an axial direction of the brake disc, wherein a second torque face defines a portion of the second drive slot; and a second surface adjacent the second drive slot; a first clip configured to position on the brake disc by sliding over the first surface in a first tangential direction of the brake disc, wherein the first clip is configured to cover at least a portion of the first torque face when the first clip is positioned on the brake disc; a second clip configured to position on the brake disc by sliding over the second surface in a second tangential direction of the brake disc opposite the first tangential direction, wherein the second clip is configured to cover at least a portion of the second torque face when the second clip is positioned on the brake disc; and a retainer configured to be slidable over the first clip and the second clip when the first clip and the second clip are positioned on the brake disc, wherein the retainer is configured to maintain the first clip and the second clip on the brake disc when at one of the first clip or the second clip experiences a force in a tangential direction of the brake disc.

Example 15: The assembly of example 14, wherein: the first clip defines a first gap configured to receive a first portion of the brake disc when first clip is positioned on the brake disc, the second clip defines a second gap configured to receive a second portion of the brake disc when second clip is positioned on the brake disc, and the retainer is configured to extend from the first clip to the second clip when the first gap receives the first portion of the brake disc and the second gap receives the second portion of the brake disc.

Example 16: The assembly of example 14 or 15, wherein the retainer is resiliently biased to generate a clamping force toward the brake disc on the first clip and on the second clip when the retainer is positioned over the first clip and over the second clip.

Example 17: The assembly of any of examples 14-16, wherein: the retainer is configured to limit movement of the first clip in an outward radial direction of the brake disc when the first clip is positioned on the brake disc and the retainer is positioned over the first clip, and the retainer is configured to limit movement of the second clip in the outward radial direction of the brake disc when the second clip is positioned on the brake disc and the retainer is positioned over the second clip.

Example 18: The assembly of any of examples 14-17, wherein the retainer is configured to conform to a portion of a perimeter of the brake disc when the retainer is positioned over the first clip and the second clip.

Example 19: A method comprising: positioning a first clip on a brake disc, wherein positioning the first clip on the brake disc comprises sliding the first clip in a first tangential direction of the brake disc over a first surface, wherein the first surface is adjacent to a first drive slot on a perimeter of the brake disc; positioning a second clip on the brake disc, wherein positioning the second clip on the brake disc comprises sliding the second clip in a second tangential direction of the brake disc over a second surface, wherein the second tangential direction is opposite the first tangential direction, and wherein the second surface is adjacent to a second drive slot on the perimeter of the brake disc; and after positioning the first and second clips on the brake disc, positioning a retainer over the first clip and the second clip, wherein positioning the retainer over the first clip and the second clip comprises sliding the retainer over the first clip and sliding the retainer over the second clip.

Example 20: The method of example 19, wherein positioning the retainer over the first clip and the second clip comprises sliding the retainer over the first clip and the second clip in a radial direction of the brake disc.

Various examples have been described. These and other examples are within the scope of the following claims.

What is claimed is:

1. An assembly comprising:
a first clip configured to be slidable over a first surface of a brake disc in a first tangential direction of the brake disc, the first surface being adjacent to a first drive slot on a perimeter of the brake disc;
a second clip configured to be slidable over a second surface of the brake disc in a second tangential direction opposite the first tangential direction, the second surface being adjacent to a second drive slot on the perimeter of the brake disc; and
a retainer configured to be slidable over the first clip and the second clip when the first clip is positioned over the first surface and the second clip is positioned over the second surface to secure the first and second clips to the brake disc,
wherein the retainer is resiliently biased to generate an inward clamping force toward the brake disc on at least one of the first clip or the second clip when the retainer is positioned over the at least one of the first clip or the second clip.

2. The assembly of claim 1, wherein at least one of the first clip or the second clip comprises a body section, the body section comprising:
a drive face; and
a back face opposite the drive face,
wherein the back face is configured to engage a torque face of the brake disc when the first clip is positioned over the first surface, and
wherein the torque face defines a portion of the first drive slot of the brake disc.

3. The assembly of claim 2, wherein the at least one of the first clip or the second clip further comprises:
a first arm extending from the body section; and
a second arm extending from the body section.

4. The assembly of claim 3, wherein the retainer is configured to contact the first arm and the second arm when the retainer is positioned over the first clip and over the second clip.

5. The assembly of claim 3, wherein the first arm and the second arm define a gap configured to receive a portion of the brake disc when the back face engages the torque face.

6. The assembly of claim 3, wherein the first arm and the second arm slant away from each other when the back face engages the torque face.

7. The assembly of claim 1, wherein the retainer defines a channel having a first open end and a second open end opposite the first open end, wherein the channel is configured to surround a portion of an individual clip when the retainer is positioned over the individual clip, wherein the individual clip is one of the first clip or the second clip.

8. The assembly of claim 1, wherein the retainer comprises a first tab and a second tab, wherein the first tab is configured to be received in a first slot of an individual clip and the second tab is configured to be received in a second slot of the individual clip when the retainer is positioned over the individual clip, wherein the individual clip is one of the first clip or the second clip.

9. The assembly of claim 8, wherein the retainer is resiliently biased to generate the inward clamping force between the first tab and the second tab when the first tab is received in the first slot and the second tab is received in the second slot.

10. The assembly of claim 1, wherein the retainer is configured to extend from the first clip to the second clip when the retainer is positioned over the first clip and the second clip.

11. The assembly of claim 1, wherein the retainer is configured to conform to a portion of a perimeter of the brake disc when the retainer is positioned over the first clip and the second clip.

12. The assembly of claim 1, wherein the first clip is configured to frictionally engage the first surface in a rivetless configuration when the retainer is positioned over the first clip, and wherein the second clip is configured to frictionally engage the second surface in a rivetless configuration when the retainer is positioned over the second clip.

13. The assembly of claim 1, wherein the retainer is configured to be slidable over the first clip and the second clip in a radial direction of the brake disc when the first clip is positioned over the first surface and the second clip is positioned over the second surface.

14. An assembly comprising:
a brake disc defining:

a first drive slot extending at least partially through a perimeter of the brake disc in an axial direction of the brake disc, wherein a first torque face defines a portion of the first drive slot;
a first surface adjacent to the first drive slot;
a second drive slot extending at least partially through the perimeter of the brake disc in an axial direction of the brake disc, wherein a second torque face defines a portion of the second drive slot; and
a second surface adjacent the second drive slot;
a first clip configured to position on the brake disc by sliding over the first surface in a first tangential direction of the brake disc, wherein the first clip is configured to cover at least a portion of the first torque face when the first clip is positioned on the brake disc;
a second clip configured to position on the brake disc by sliding over the second surface in a second tangential direction of the brake disc opposite the first tangential direction, wherein the second clip is configured to cover at least a portion of the second torque face when the second clip is positioned on the brake disc; and
a retainer configured to be slidable over the first clip and the second clip when the first clip and the second clip are positioned on the brake disc,
wherein the retainer is configured to maintain the first clip and the second clip on the brake disc when at one of the first clip or the second clip experiences a force in a tangential direction of the brake disc, and
wherein the retainer comprises a first tab and a second tab, wherein the first tab is configured to be received in a first slot of an individual clip and the second tab is configured to be received in a second slot of the individual clip when the retainer is positioned over the individual clip, wherein the individual clip is one of the first clip or the second clip.

15. The assembly of claim 14, wherein:
the first clip defines a first gap configured to receive a first portion of the brake disc when first clip is positioned on the brake disc,
the second clip defines a second gap configured to receive a second portion of the brake disc when second clip is positioned on the brake disc, and
the retainer is configured to extend from the first clip to the second clip when the first gap receives the first portion of the brake disc and the second gap receives the second portion of the brake disc.

16. The assembly of claim 14, wherein the retainer is resiliently biased to generate a clamping force toward the brake disc on the first clip and on the second clip when the retainer is positioned over the first clip and over the second clip.

17. The assembly of claim 14, wherein:
the retainer is configured to limit movement of the first clip in an outward radial direction of the brake disc when the first clip is positioned on the brake disc and the retainer is positioned over the first clip, and
the retainer is configured to limit movement of the second clip in the outward radial direction of the brake disc when the second clip is positioned on the brake disc and the retainer is positioned over the second clip.

18. The assembly of claim 14, wherein the retainer is configured to conform to a portion of a perimeter of the brake disc when the retainer is positioned over the first clip and the second clip.

19. A method comprising:
positioning a first clip on a brake disc, wherein positioning the first clip on the brake disc comprises sliding the first clip in a first tangential direction of the brake disc over a first surface, wherein the first surface is adjacent to a first drive slot on a perimeter of the brake disc;
positioning a second clip on the brake disc, wherein positioning the second clip on the brake disc comprises sliding the second clip in a second tangential direction of the brake disc over a second surface, wherein the second tangential direction is opposite the first tangential direction, and wherein the second surface is adjacent to a second drive slot on the perimeter of the brake disc;
after positioning the first and second clips on the brake disc, positioning a retainer over the first clip and the second clip, wherein positioning the retainer over the first clip and the second clip comprises sliding the retainer over the first clip and sliding the retainer over the second clip; and
exerting, using a resilient biasing of the retainer, an inward clamping force toward the brake disc on at least one of the first clip or the second clip when the retainer is positioned over the first clip and the second clip.

20. The method of claim 19, wherein positioning the retainer over the first clip and the second clip comprises sliding the retainer over the first clip and the second clip in a radial direction of the brake disc.

* * * * *